United States Patent
Degura et al.

(10) Patent No.: US 12,172,906 B2
(45) Date of Patent: Dec. 24, 2024

(54) PRECURSOR FOR LITHIUM SECONDARY BATTERY POSITIVE ELECTRODE ACTIVE MATERIALS, METHOD FOR PRODUCING PRECURSOR FOR LITHIUM SECONDARY BATTERY POSITIVE ELECTRODE ACTIVE MATERIALS, AND METHOD FOR PRODUCING LITHIUM COMPOSITE METAL COMPOUND

(71) Applicants: SUMITOMO CHEMICAL COMPANY, LIMITED, Tokyo (JP); TANAKA CHEMICAL CORPORATION, Fukui (JP)

(72) Inventors: Keiji Degura, Fukui (JP); Ryota Kobayashi, Fukui (JP); Yusuke Maeda, Fukui (JP)

(73) Assignees: SUMITOMO CHEMICAL COMPANY, LIMITED, Tokyo (JP); TANAKA CHEMICAL CORPORATION, Fukui (JP)

( * ) Notice: Subject to any disclaimer, the term of this patent is extended or adjusted under 35 U.S.C. 154(b) by 754 days.

(21) Appl. No.: 17/298,815

(22) PCT Filed: Dec. 6, 2019

(86) PCT No.: PCT/JP2019/047941
§ 371 (c)(1),
(2) Date: Jun. 1, 2021

(87) PCT Pub. No.: WO2020/116649
PCT Pub. Date: Jun. 11, 2020

(65) Prior Publication Data
US 2022/0033275 A1    Feb. 3, 2022

(30) Foreign Application Priority Data
Dec. 7, 2018  (JP) .................................. 2018-230351

(51) Int. Cl.
*C01G 53/04*  (2006.01)
*C01G 53/00*  (2006.01)
(Continued)

(52) U.S. Cl.
CPC .......... *C01G 53/04* (2013.01); *C01G 53/006* (2013.01); *H01M 4/525* (2013.01);
(Continued)

(58) Field of Classification Search
None
See application file for complete search history.

(56) References Cited

U.S. PATENT DOCUMENTS

2006/0083989 A1   4/2006   Suhara et al.
2010/0117031 A1   5/2010   Akagi et al.
(Continued)

FOREIGN PATENT DOCUMENTS

CN   1774400 A     5/2006
CN   106745336 A   5/2017
(Continued)

OTHER PUBLICATIONS

English translation of CN-108258235-A Description (Year: 2018).*
(Continued)

*Primary Examiner* — Daniel Berns
*Assistant Examiner* — Zachary John Baum
(74) *Attorney, Agent, or Firm* — Rimon P.C.

(57) ABSTRACT

A precursor for lithium secondary battery positive electrode active materials containing at least nickel, in which the following formula (1) is satisfied.

$$0.20 \leq D_{min}/D_{max} \tag{1}$$

(in the formula (1), $D_{min}$ is a minimum particle diameter (µm) in a cumulative particle size distribution curve obtained by measuring the precursor for lithium sec-
(Continued)

ondary battery positive electrode active materials with a laser diffraction-type particle size distribution measuring instrument, and Dmax is a maximum particle diameter (μm) in the cumulative particle size distribution curve obtained by the measurement with the laser diffraction-type particle size distribution measuring instrument.).

26 Claims, 1 Drawing Sheet

(51) Int. Cl.
 H01M 4/525 (2010.01)
 H01M 10/0525 (2010.01)
(52) U.S. Cl.
 CPC ..... *H01M 10/0525* (2013.01); *C01P 2002/72* (2013.01); *C01P 2004/61* (2013.01); *C01P 2006/12* (2013.01)

(56) References Cited

U.S. PATENT DOCUMENTS

| | | | |
|---|---|---|---|
| 2011/0318638 A1 | 12/2011 | Koh et al. | |
| 2012/0012776 A1 | 1/2012 | Kagei et al. | |
| 2013/0032753 A1 | 2/2013 | Yamamoto et al. | |
| 2015/0243984 A1* | 8/2015 | Kase | C01G 53/006 429/223 |
| 2017/0133677 A1 | 5/2017 | Ryoshi et al. | |
| 2017/0214045 A1 | 7/2017 | Dai et al. | |
| 2018/0205079 A1 | 7/2018 | Takahashi et al. | |
| 2019/0058191 A1 | 2/2019 | Mitsumoto et al. | |

FOREIGN PATENT DOCUMENTS

| | | | | |
|---|---|---|---|---|
| CN | 106935845 A | | 7/2017 | |
| CN | 107915263 A | | 4/2018 | |
| CN | 108258201 A | | 7/2018 | |
| CN | 108258235 A | * | 7/2018 | ............ C01G 45/02 |
| JP | 2001-155728 A | | 6/2001 | |
| JP | 2003-187801 A | | 7/2003 | |
| JP | 2005-085539 A | | 3/2005 | |
| JP | 2005-346956 A | | 12/2005 | |
| JP | 3974396 B2 | | 9/2007 | |
| JP | 2008-147068 A | | 6/2008 | |
| JP | 2008-153017 A | | 7/2008 | |
| JP | 2008-282803 A | | 11/2008 | |
| JP | 2011-082188 A | | 4/2011 | |
| JP | 2011-198759 A | | 10/2011 | |
| JP | 2012-043716 A | | 3/2012 | |
| JP | 2016-011225 A | | 1/2016 | |
| JP | 2016-153347 A | | 8/2016 | |
| JP | 2017130395 A | * | 7/2017 | |
| WO | 2010/092976 A1 | | 8/2010 | |
| WO | 2012/026527 A1 | | 3/2012 | |
| WO | 2013/027432 A1 | | 2/2013 | |
| WO | 2014/051089 A1 | | 4/2014 | |
| WO | 2017/033895 A1 | | 3/2017 | |
| WO | 2017/146248 A1 | | 8/2017 | |
| WO | 2018/139657 A1 | | 8/2018 | |
| WO | 2018/198494 A1 | | 11/2018 | |

OTHER PUBLICATIONS

English translation of JP-2017130395-A Description. (Year: 2017).*
Huang An-Ni et al., "Effects of particle mass loading on the hydrodynamics and separation efficiency of a cyclone separator", Journal of the Taiwan Institute of Chemical Engineers, Elsevier, Amsterdam, NL, vol. 90, Jan. 3, 2018 (Jan. 3, 2018), pp. 61-67.
Extended European Search Report issued in corresponding European Patent Application No. 19891921.9-1108, dated Aug. 1, 2022.
Chinese Third Party Observation issued in corresponding Chinese Patent Application No. 201980079596.X, dated Jul. 18, 2023, with English translation.
International Search Report issued in corresponding International Patent Application No. PCT/JP2019/047941, dated Feb. 10, 2020, with English translation.
Japanese Notice of Reasons for Refusal issued in corresponding Japanese Patent Application No. 2018-230351, dated Oct. 1, 2019, with English translation.
Taiwanese Office Action issued in corresponding Taiwanese Patent Application No. 108145010, dated Feb. 23, 2023, with English translation.
Office Action issued in the corresponding Chinese patent Application No. 201980079596.X dated May 18, 2024, w/ English Translation.

* cited by examiner

PRECURSOR FOR LITHIUM SECONDARY BATTERY POSITIVE ELECTRODE ACTIVE MATERIALS, METHOD FOR PRODUCING PRECURSOR FOR LITHIUM SECONDARY BATTERY POSITIVE ELECTRODE ACTIVE MATERIALS, AND METHOD FOR PRODUCING LITHIUM COMPOSITE METAL COMPOUND

CROSS REFERENCE TO RELATED APPLICATIONS

This application is the U.S. National Phase under 35 U.S.C. § 371 of International Application No. PCT/JP2019/047941, filed on Dec. 6, 2019, which claims the benefit of Japanese Application No. 2018-230351, filed on Dec. 7, 2018, the entire contents of each are hereby incorporated by reference.

TECHNICAL FIELD

The present invention relates to a precursor for lithium secondary battery positive electrode active materials, a method for producing a precursor for lithium secondary battery positive electrode active materials, and a method for producing a lithium composite metal compound.

BACKGROUND ART

Lithium composite metal compounds are being used as lithium secondary battery positive electrode active materials. Attempts of putting lithium secondary batteries into practical use not only for small-sized power sources in mobile phone applications, notebook personal computer applications, and the like but also for medium-sized or large-sized power sources in automotive applications, power storage applications, and the like have already been underway.

As an example of a method for producing a lithium composite metal compound, there is a method in which a precursor containing metal elements other than lithium (for example, nickel, cobalt, manganese, and the like) is produced and the obtained precursor and a lithium compound are calcined.

By the way, it is known that use of a positive electrode active material including particles having a narrow particle size distribution enables lithium secondary batteries having excellent battery characteristics to be provided for reasons that the particles have an excellent property of being loaded into electrodes and voltages that are applied to the particles in electrodes become uniform. For example, Patent Document 1 describes a nickel cobalt composite hydroxide (precursor) having a sharp particle size distribution and a method for producing the same. The adjustment of the particle size distribution of a precursor makes it possible to control the particle size distributions of positive electrode active materials to be produced.

CITATION LIST

Patent Document

Patent Document 1

PCT International Publication No. WO 2014/051089

SUMMARY OF INVENTION

Technical Problem

In lithium secondary battery positive electrode active materials for which a precursor as described in Patent Document 1 is used, there is room for improvement from the viewpoint of the improvement of battery characteristics.

The present invention has been made in view of the above-described circumstances, and an object of the present invention is to provide a precursor for lithium secondary battery positive electrode active materials that has a specific particle size distribution and contains a small amount of an impurity in the precursor, which are one of the factors that degrade battery characteristics, a method for producing a precursor for lithium secondary battery positive electrode active materials, and a method for producing a lithium composite metal compound.

Solution to Problem

That is, the present invention includes the following inventions [1] to [13].

[1] A precursor for lithium secondary battery positive electrode active materials containing at least nickel, in which the following formula (1) is satisfied.

$$0.2 \leq D\mathrm{min}/D\mathrm{max} \tag{1}$$

(In the formula (1), Dmin is a minimum particle diameter (μm) in a cumulative particle size distribution curve obtained by measurement with a laser diffraction-type particle size distribution measuring instrument, and Dmax is a maximum particle diameter (μm) in the cumulative particle size distribution curve obtained by the measurement with the laser diffraction-type particle size distribution measuring instrument.)

[2] The precursor for lithium secondary battery positive electrode active materials according to [1], in which the precursor is represented by the following composition formula (A).

$$\mathrm{Ni}_{1-x-y}\mathrm{Co}_x\mathrm{M}_y\mathrm{O}_z(\mathrm{OH})_{2-\alpha} \tag{A}$$

(In the composition formula (A), $0 \leq x \leq 0.45$, $0 \leq y \leq 0.45$, $0 \leq x+y \leq 0.9$, $0 \leq z \leq 3$, $-0.5 \leq \alpha \leq 2$, and M is one or more metal elements selected from the group consisting of Zr, Al, Ti, Mn, Ga, In, and W.)

[3] The precursor for lithium secondary battery positive electrode active materials according to [1] or [2], in which the following formulae (2) and (3) are satisfied.

$$(D50-D10)/D50 \leq 0.35 \tag{2}$$

$$(D90-D50)/D50 \leq 0.50 \tag{3}$$

(In the formulae (2) and (3), D10 is a value (μm) of a particle diameter at a point at which a cumulative volume reaches 10% from a small particle side in a cumulative particle size distribution curve, with the total cumulative volume being set to 100%, obtained by measuring the precursor with the laser diffraction-type particle size distribution measuring instrument, D50 is a value (μm) of a particle diameter at a point at which the cumulative volume reaches 50%, and D90 is a value (μm) of a particle diameter at a point at which a cumulative volume reaches 90%.)

[4] The precursor for lithium secondary battery positive electrode active materials according to any one of [1] to [3], in which the following formula (4) is satisfied.

$$10\mu m \leq D50 \leq 30\mu m \quad (4)$$

[5] The precursor for lithium secondary battery positive electrode active materials according to any one of [1] to [4], in which a BET specific surface area is 2 m$^2$/g or more and 80 m$^2$/g or less.

[6] The precursor for lithium secondary battery positive electrode active materials according to any one of [1] to [5], in which the following formula (5) is satisfied.

$$0.65 \leq \alpha/\beta \leq 1.45 \quad (5)$$

(In the formula (5), α is a half width of a diffraction peak at 2θ=52.4±1° that is obtained by X-ray diffraction using a CuKα ray, and β is a half width of a diffraction peak at 2θ=73.9±1° that is obtained by X-ray diffraction using a CuKα ray.)

[7] A method for producing a precursor for lithium secondary battery positive electrode active materials, the method including a slurry preparation step of supplying a metal-containing aqueous solution containing at least nickel and an alkaline aqueous solution to a reaction vessel to obtain a hydroxide-containing slurry and a classification step of classifying the hydroxide-containing slurry using a screen.

[8] The method for producing a precursor for lithium secondary battery positive electrode active materials according to [7] further including a reflux step of supplying the slurry that has passed through the screen to the reaction vessel.

[9] The method for producing a precursor for lithium secondary battery positive electrode active materials according to [7] or [8], in which a material of the screen is a polymer material.

[10] The method for producing a precursor for lithium secondary battery positive electrode active materials according to any one of [7] to [9], in which, in the classification step, a classification device includes a rotatable screw inside a fixed screen, and the hydroxide-containing slurry is classified by rotating the screw at a circumferential velocity of 1.0 m/second or faster and 10.0 m/second or slower.

[11] A method for producing a precursor for lithium secondary battery positive electrode active materials including a slurry preparation step of supplying a metal-containing aqueous solution containing at least nickel and an alkaline aqueous solution to a reaction vessel to obtain a hydroxide-containing slurry and a classification step of classifying the hydroxide-containing slurry with a liquid cyclone-type classification device, in which the classification step is carried out under a condition that a classification device inlet pressure is 0.01 MPa or more and 0.07 MPa or less.

[12] The method for producing a precursor for lithium secondary battery positive electrode active materials according to any one of [7] to [11] further having a heating step of heating a precursor in an oxygen-containing atmosphere within a temperature range of 300° C. or higher and 900° C. or lower.

[13] A method for producing a lithium composite metal compound having a mixing step of mixing the precursor obtained by the method for producing a precursor for lithium secondary battery positive electrode active materials according to any one of [7] to [12] and a lithium-containing compound and a calcining step of calcining the obtained mixture in an oxygen-containing atmosphere at a temperature of 500° C. or higher and 1000° C. or lower.

Furthermore, the present invention includes the following (1) to (17).

(1) A precursor for lithium secondary battery positive electrode active materials containing at least nickel, in which the following formula (1) is satisfied.

$$0.20 \leq Dmin/Dmax \quad (1)$$

(In the formula (1), Dmin is a minimum particle diameter (μm) in a cumulative particle size distribution curve obtained by measuring the precursor for lithium secondary battery positive electrode active materials with a laser diffraction-type particle size distribution measuring instrument, and Dmax is a maximum particle diameter (μm) in the cumulative particle size distribution curve obtained by the measurement with the laser diffraction-type particle size distribution measuring instrument.)

(2) The precursor for lithium secondary battery positive electrode active materials according to (1), in which the precursor is represented by the following composition formula (A).

$$Ni_{1-x-y}Co_xM_yO_z(OH)_{2-\alpha} \quad (A)$$

(In the composition formula (A), 0≤x≤0.45, 0≤y≤0.45, 0≤x+y≤0.9, 0≤z≤3, −0.5≤α≤2, and M is one or more metal elements selected from Zr, Al, Ti, Mn, Ga, In, and W.)

(3) The precursor for lithium secondary battery positive electrode active materials according to (1) or (2), in which the following formula (4) is satisfied.

$$10\mu m \leq D50 \leq 30\mu m \quad (4)$$

(In the formula (4), D50 is a value (μm) of a particle diameter at a point at which a cumulative volume reaches 50% from a small particle side in a cumulative particle size distribution curve, with the total cumulative volume being set to 100%, obtained by measuring the precursor for lithium secondary battery positive electrode active materials with the laser diffraction-type particle size distribution measuring instrument.)

(4) The precursor for lithium secondary battery positive electrode active materials according to any one of (1) to (3), in which the following formulae (2) and (3) are satisfied.

$$(D50-D10)/D50 \leq 0.35 \quad (2)$$

$$(D90-D50)/D50 \leq 0.50 \quad (3)$$

(In the formula (2), D10 is a value (μm) of a particle diameter at a point at which a cumulative volume reaches 10% from a small particle side in a cumulative particle size distribution curve, with the total cumulative volume being set to 100%, obtained by measuring the precursor for lithium secondary battery positive electrode active materials with the laser diffraction-type particle size distribution measuring instrument, D50 is a value (μm) of a particle diameter at a point at which the cumulative volume reaches 50%, and D90 is a value (μm) of a particle diameter at a point at which a cumulative volume reaches 90%.)

(5) The precursor for lithium secondary battery positive electrode active materials according to any one of (1) to (4), in which a BET specific surface area is 2 m$^2$/g or more and 80 m$^2$/g or less.

(6) The precursor for lithium secondary battery positive electrode active materials according to any one of (1) to (5), in which the following formula (5) is satisfied.

$$0.65 \leq \alpha/\beta \leq 1.45 \quad (5)$$

(In the formula (5), α is a half width of a diffraction peak at 2θ=52.4±1° that is obtained by X-ray diffraction using a CuKα ray, and β is a half width of a diffraction peak at 2θ=73.9±1° that is obtained by X-ray diffraction using a CuKα ray.)

(7) A method for producing a precursor for lithium secondary battery positive electrode active materials, the method including a slurry preparation step of supplying a metal-containing aqueous solution containing at least nickel and an alkaline aqueous solution to a reaction vessel to obtain a hydroxide-containing slurry and a classification step of classifying the hydroxide-containing slurry using a screen.

(8) The method for producing a precursor for lithium secondary battery positive electrode active materials according to (7), in which the precursor for lithium secondary battery positive electrode active materials is represented by the following composition formula (A).

$$Ni_{1-x-y}Co_xM_yO_z(OH)_{2-\alpha} \qquad (A)$$

(In the composition formula (A), 0≤x≤0.45, 0≤y≤0.45, 0≤x+y≤0.9, 0≤z≤3, −0.5≤α≤2, and M is one or more metal elements selected from Zr, Al, Ti, Mn, Ga, In, and W.)

(9) The method for producing a precursor for lithium secondary battery positive electrode active materials according to (7) or (8), in which the precursor for lithium secondary battery positive electrode active materials satisfies the following formula (4).

$$10\mu m \leq D50 \leq 30\mu m \qquad (4)$$

(In the formula (4), D50 is a value (μm) of a particle diameter at a point at which a cumulative volume reaches 50% from a small particle side in a cumulative particle size distribution curve, with the total cumulative volume being set to 100%, obtained by measuring the precursor for lithium secondary battery positive electrode active materials with the laser diffraction-type particle size distribution measuring instrument.)

(10) The method for producing a precursor for lithium secondary battery positive electrode active materials according to any one of (7) to (9), further including a reflux step of supplying the slurry that has passed through the screen to the reaction vessel.

(11) The method for producing a precursor for lithium secondary battery positive electrode active materials according to any one of (7) to (10), in which a material of the screen is a polymer material.

(12) The method for producing a precursor for lithium secondary battery positive electrode active materials according to any one of (7) to (11), in which, in the classification step, a classification device includes a rotatable screw inside a fixed screen, and the hydroxide-containing slurry is classified by rotating the screw at a circumferential velocity of 1.0 m/second or faster and 10.0 m/second or slower.

(13) A method for producing a precursor for lithium secondary battery positive electrode active materials including a slurry preparation step of supplying a metal-containing aqueous solution containing at least nickel and an alkaline aqueous solution to a reaction vessel to obtain a hydroxide-containing slurry and a classification step of classifying the hydroxide-containing slurry with a liquid cyclone-type classification device, in which the classification step is carried out under a condition that a classification device inlet pressure is 0.01 MPa or more and 0.07 MPa or less.

(14) The method for producing a precursor for lithium secondary battery positive electrode active materials according to (13), in which the precursor for lithium secondary battery positive electrode active materials is represented by the following composition formula (A).

$$Ni_{1-x-y}Co_xM_yO_z(OH)_{2-\alpha} \qquad (A)$$

(In the composition formula (A), 0≤x≤0.45, 0≤y≤0.45, 0≤x+y≤0.9, 0≤z≤3, −0.5≤α≤2, and M is one or more metal elements selected from Zr, Al, Ti, Mn, Ga, In, and W.)

(15) The method for producing a precursor for lithium secondary battery positive electrode active materials according to (13) or (14), in which the precursor for lithium secondary battery positive electrode active materials satisfies the following formula (4).

$$10\mu m \leq D50 \leq 30\mu m \qquad (4)$$

(In the formula (4), D50 is a value (μm) of a particle diameter at a point at which a cumulative volume reaches 50% from a small particle side in a cumulative particle size distribution curve, with the total cumulative volume being set to 100%, obtained by measuring the precursor for lithium secondary battery positive electrode active materials with the laser diffraction-type particle size distribution measuring instrument.)

(16) The method for producing a precursor for lithium secondary battery positive electrode active materials according to any one of (7) to (15), further having a heating step of heating a precursor in an oxygen-containing atmosphere within a temperature range of 300° C. or higher and 900° C. or lower.

(17) A method for producing a lithium composite metal compound having a mixing step of mixing the precursor obtained by the method for producing a precursor for lithium secondary battery positive electrode active materials according to any one of (7) to (16) and a lithium compound and a calcining step of calcining the obtained mixture in an oxygen-containing atmosphere at a temperature of 500° C. or higher and 1000° C. or lower.

Advantageous Effects of Invention

According to the present invention, it is possible to provide a precursor for lithium secondary battery positive electrode active materials in which the content of silicon, which is an impurity, is small, a method for producing a precursor for lithium secondary battery positive electrode active materials, and a method for producing a lithium composite metal compound.

DESCRIPTION OF EMBODIMENTS

Figure 1A:
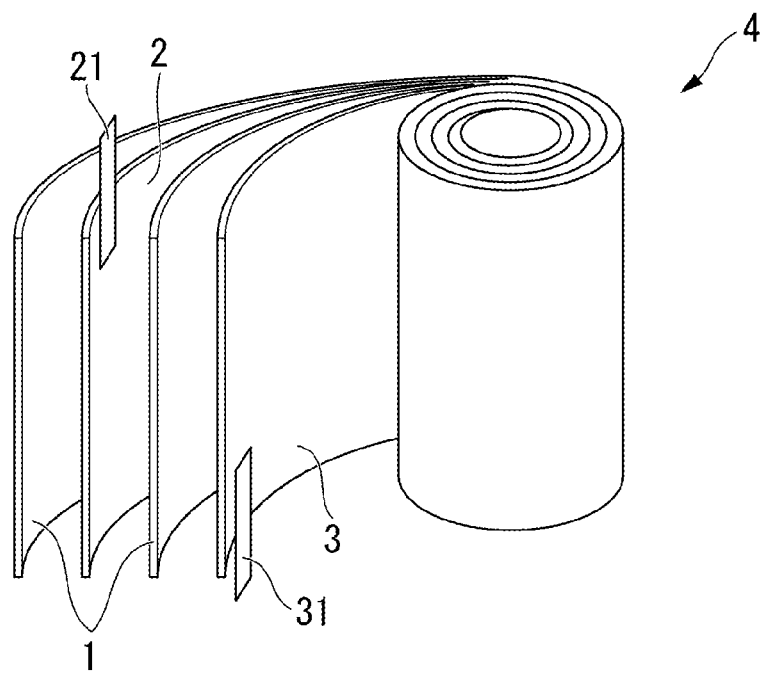
FIG. 1A is a schematic configuration view showing an example of a lithium-ion secondary battery.

≤Precursor for Lithium Secondary Battery Positive Electrode Active Materials>

The present embodiment is a precursor for lithium secondary battery positive electrode active materials. Hereinafter, the precursor for lithium secondary battery positive electrode active materials may be simply referred to as "precursor" in some cases. Since the precursor of the present embodiment has a specific particle size distribution, the content of silicon, which is an impurity, is low. When such a precursor is mixed with a lithium compound and calcined, it is possible to produce a lithium composite metal compound that is useful as a lithium secondary battery positive electrode active material.

Formula (1)

The precursor of the present embodiment satisfies the following formula (1).

$$0.20 \leq Dmin/Dmax \quad (1)$$

(In the formula (1), Dmin is the minimum particle diameter (μm) in a cumulative particle size distribution curve obtained by measurement with a laser diffraction-type particle size distribution measuring instrument. Dmax is the maximum particle diameter (μm) in the cumulative particle size distribution curve obtained by the measurement with the laser diffraction-type particle size distribution measuring instrument.)

The cumulative volume particle size distribution of the precursor is measured by the laser diffraction scattering method.

A 10 mass % sodium hexametaphosphate aqueous solution (250 μL) is injected as a dispersant into MICROTRAC MT3300EXII manufactured by MicrotracBell Corp. and the particle size distribution is measured, thereby obtaining a volume-based cumulative particle size distribution curve. The powder of the precursor is injected such that the transmittance at the time of measurement reaches 85±5%.

In addition, in the obtained cumulative particle size distribution curve, the value of the particle diameter at a point at which the cumulative volume from the small particle side reaches 10% is defined as D10 (μm), the value of the particle diameter at a point at which the cumulative volume reaches 50% is D50 (μm), and the value of the particle diameter at a point at which the cumulative volume reaches 90% is defined as D90 (μm). Furthermore, the cumulative volume particle size distribution is measured a plurality of times, median values are obtained from the data of the minimum particle diameters and the maximum particle diameters that are each within a fluctuation error range of 10%, the value of the minimum particle diameter is defined as Dmin (μm), and the value of the maximum particle diameter is defined as Dmax (μm).

In the present embodiment, the lower limit value of the formula (1) is preferably 0.20, more preferably 0.21, and particularly preferably 0.22. The upper limit value of the formula (1) is preferably 0.30, more preferably 0.29, and particularly preferably 0.28.

The above-described upper limit value and lower limit value can be randomly combined together. Examples of the combination are shown in the following (1)-1 to (1)-3.

In the following (1)-1 to (1)-3, (1)-1 is more preferable.

$$0.20 \leq Dmin/Dmax \leq 0.30 \quad (1)\text{-}1$$

$$0.21 \leq Dmin/Dmax \leq 0.29 \quad (1)\text{-}2$$

$$0.22 \leq Dmin/Dmax \leq 0.28 \quad (1)\text{-}3$$

The precursor of the present embodiment that satisfies the formula (1) has a specific particle size distribution and has a low content of silicon, which is an impurity. When such a precursor and a lithium compound are mixed together and calcined, in a lithium composite metal compound to be produced, the content of silicon, which is an impurity, is reduced, and a calcining reaction is likely to proceed uniformly. When a lithium composite metal compound in which the content of silicon, which is an impurity, or baking unevenness is reduced is used as a positive electrode active material, the charging and discharging load is less likely to vary with particles, and the battery characteristics such as cycle characteristics become favorable.

Formula (2) and Formula (3)

The precursor of the present embodiment preferably satisfies any one or both of the following formulae (2) and (3).

$$(D50-D10)/D50 \leq 0.35 \quad (2)$$

$$(D90-D50)/D50 \leq 0.50 \quad (3)$$

(In the formulae (2) and (3), D10 is the value (μm) of a particle diameter at a point at which the cumulative volume reaches 10% from the small particle side in the cumulative particle size distribution curve, with the total cumulative volume being set to 100%, obtained by measuring the precursor with the laser diffraction-type particle size distribution measuring instrument, D50 is the value (μm) of a particle diameter at a point at which the cumulative volume reaches 50%, and D90 is the value (μm) of a particle diameter at a point at which a cumulative volume reaches 90%)

Formula (2)

In the present embodiment, the lower limit value of the formula (2) is preferably 0.15, more preferably 0.16, particularly preferably 0.17, and more particularly preferably 0.18. The upper limit value of the formula (2) is preferably 0.34, more preferably 0.33, and particularly preferably 0.32.

The above-described upper limit value and lower limit value can be randomly combined together. Examples of the combination are shown in the following (2)-1 to (2)-4.

$$0.15 \leq (D50-D10)/D50 \leq 0.35 \quad (2)\text{-}1$$

$$0.16 \leq (D50-D10)/D50 \leq 0.34 \quad (2)\text{-}2$$

$$0.17 \leq (D50-D10)/D50 \leq 0.33 \quad (2)\text{-}3$$

$$0.18 \leq (D50-D10)/D50 \leq 0.32 \quad (2)\text{-}4$$

Formula (3)

In the present embodiment, the lower limit value of the formula (3) is preferably 0.27, more preferably 0.28, particularly preferably 0.29, and more particularly preferably 0.30. The upper limit value of the formula (3) is preferably 0.48, more preferably 0.46, and particularly preferably 0.44.

The above-described upper limit value and lower limit value can be randomly combined together. Examples of the combinations are shown in the following (3)-1 to (3)-5.

$$0.27 \leq (D90-D50)/D50 \leq 0.50 \quad (3)\text{-}1$$

$$0.28 \leq (D90-D50)/D50 \leq 0.48 \quad (3)\text{-}2$$

$$0.29 \leq (D90-D50)/D50 \leq 0.46 \quad (3)\text{-}3$$

$$0.30 \leq (D90-D50)/D50 \leq 0.44 \quad (3)\text{-}4$$

$$0.30 \leq (D90-D50)/D50 \leq 0.50 \quad (3)\text{-}5$$

The precursor of the present embodiment that satisfies any one or both of the formulae (2) and (3) has a low content of silicon, which is an impurity.

Secondary batteries for which a positive electrode active material that is produced using the precursor of the present embodiment is used are capable of sufficiently improving the cycle characteristics.

Formula (4)

The precursor of the present embodiment preferably further satisfies the formula (4).

$$10\,\mu m \leq D50 \leq 30\,\mu m \quad (4)$$

In the present embodiment, the lower limit value of the formula (4) is preferably 11 μm, more preferably 12 μm, and particularly preferably 13 μm. The upper limit value is preferably 27 μm or less, more preferably 25 μm or less, and particularly preferably 23 μm or less.

The above-described upper limit value and lower limit value can be randomly combined together. Examples of the combination are shown in the following (4)-1 to (4)-3.

$$11\mu m \leq D50 \leq 27\mu m \quad (4)\text{-}1$$

$$12\mu m \leq D50 \leq 25\mu m \quad (4)\text{-}2$$

$$13\mu m \leq D50 \leq 23\mu m \quad (4)\text{-}3$$

Positive electrode active materials that are produced using the precursor of the present embodiment that satisfies the formula (4) efficiently react with a lithium raw material. Therefore, it is possible to obtain excellent positive electrode active materials.

Formula (5)

The precursor of the present embodiment preferably further satisfies the formula (5). In addition, the lower limit value is preferably 0.75 or more, more preferably 0.85 or more, and particularly preferably 0.95 or more.

$$0.65 \leq \alpha/\beta \leq 1.45 \quad (5)$$

(In the formula (5), $\alpha$ is the half width of a diffraction peak at $2\theta=52.4\pm1°$ that is obtained by powder X-ray diffraction measurement using a CuKα ray, and β is the half width of a diffraction peak at $2\theta=73.9\pm1°$ that is obtained by powder X-ray diffraction measurement using a CuKα ray.)

In the powder X-ray diffraction measurement, an X-ray diffractometer (for example, Ultima IV manufactured by Rigaku Corporation) is used, the powder of the precursor is loaded into a dedicated substrate, and measurement is carried out using a Cu-Kα radiation source under conditions of a diffraction angle of $2\theta=10°$ to $90°$, a sampling width of $0.03°$, and a scan speed of $20°$/min, thereby obtaining a powder X-ray diffraction pattern. Next, the powder X-ray diffraction pattern is analyzed using an integrated X-ray powder diffraction software PDXL (Rigaku Corporation), and the half width $\alpha$ of a peak at $2\theta=52.4\pm1°$ and the half width β of a peak at $2\theta=73.9\pm1°$ are obtained.

Composition Formula (A)

The precursor of the present embodiment is preferably represented by the following composition formula (A).

$$Ni_{1-x-y}Co_xM_yO_z(OH)_{2-\alpha} \quad (A)$$

(In the composition formula (A), $0 \leq x \leq 0.45$, $0 \leq y \leq 0.45$, $0 \leq x+y \leq 0.9$, $0 \leq z \leq 3$, $-0.5 \leq \alpha \leq 2$, and M is one or more metal elements selected from Zr, Al, Ti, Mn, Ga, In, and W.)

x

The lower limit value of x is preferably 0.01, more preferably 0.02, and particularly preferably 0.03. The upper limit value of x is preferably 0.44, more preferably 0.42, and particularly preferably 0.40. The above-described upper limit value and lower limit value can be randomly combined together.

In an example of the combination, x is preferably $0.01 \leq x \leq 0.44$, more preferably $0.02 \leq x \leq 0.42$, and particularly preferably $0.03 \leq x \leq 0.40$.

y

The lower limit value of y is preferably 0.01, more preferably 0.02, particularly preferably 0.03. The upper limit value of y is preferably 0.44, more preferably 0.42, and particularly preferably 0.40. The above-described upper limit value and lower limit value can be randomly combined together.

In an example of the combination, y is preferably $0.01 \leq y \leq 0.42$, more preferably $0.02 \leq y \leq 0.44$, and particularly preferably $0.03 \leq y \leq 0.40$.

z

The lower limit value of z is preferably 0.1, more preferably 0.2, and particularly preferably 0.3. The upper limit value of z is preferably 2.9, more preferably 2.8, and particularly preferably 2.7. The above-described upper limit value and lower limit value can be randomly combined together.

In an example of the combination, z is preferably $0.1 \leq z \leq 2.9$, more preferably $0.2 \leq z \leq 2.8$, and particularly preferably $0.3 \leq z \leq 2.7$.

α

The lower limit value of $\alpha$ is preferably −0.45, more preferably −0.4, and particularly preferably −0.35. The upper limit value of a is preferably 1.8, more preferably 1.6, and particularly preferably 1.4. The above-described upper limit value and lower limit value can be randomly combined together.

In an example of the combination, a is preferably $-0.45 \leq \alpha \leq 1.8$, more preferably $-0.4 \leq \alpha \leq 1.6$, and particularly preferably $-0.35 \leq \alpha \leq 1.4$.

M

In the formula (A), M is one or more metal elements selected from the group consisting of Zr, Al, Ti, Mn, Ga, In, and W. Among these, one or more metal elements selected from the group consisting of Zr, Al, and Mn are preferable. Since Ga and In are elements belonging to the same group as Al, the same effect as Al can be obtained.

BET Specific Surface Area

The BET specific surface area of the precursor of the present embodiment is preferably 2 m²/g or more, more preferably 4 m²/g or more, and particularly preferably 6 m²/g or more. In addition, the BET specific surface area of the precursor of the present embodiment is preferably 80 m²/g or less, more preferably 65 m²/g or less, and particularly preferably 50 m²/g or less.

The above-described upper limit value and lower limit value can be randomly combined together. As the specific combination, the BET specific surface areas of the precursor of the present embodiment of 2 m²/g or more and 80 m²/g or less, 4 m²/g or more and 65 m²/g or less, and 6 m²/g or more and 50 m²/g or less are exemplary examples. Among these combinations, 2 m²/g or more and 80 m²/g or less is preferable.

Positive electrode active materials that are produced using the precursor of the present embodiment having a BET specific surface area in the above-described range are likely to enhance the output characteristics of secondary batteries.

The "BET specific surface area" is a value that is measured by the Brunauer, Emmet, and Teller (BET) method. The BET specific surface area is measured using a measuring instrument (for example, Macsorb (registered trademark) manufactured by Mountech Co., Ltd.) after drying the powder of the precursor in a nitrogen atmosphere at 105° C. for 30 minutes.

Aspects of the precursor of the present embodiment are exemplified.

(i) One aspect of the precursor of the present embodiment satisfies the formula (1).

(ii) One aspect of the precursor of the present embodiment satisfies the formula (1) and is represented by the composition formula (A).

(iii) One aspect of the precursor of the present embodiment satisfies the formula (1) and satisfies the formula (4).

(iv) One aspect of the precursor of the present embodiment satisfies the formula (1), satisfies the formula (4), and is represented by the composition formula (A).

Any one aspect of the (i) to (iv) preferably further satisfies the formula (3).

Any one aspect of the (i) to (iv) preferably satisfies the formula (3) and further satisfies the formula (2).

Any one aspect of the (i) to (iv) preferably satisfies the formula (3), satisfies the formula (2), and, furthermore, has a BET specific surface area of 2 m²/g or more and 80 m²/g or less.

Any one aspect of the (i) to (iv) preferably satisfies the formula (3), satisfies the formula (2), has a BET specific surface area of 2 m²/g or more and 80 m²/g or less, and furthermore, satisfies the formula (5).

≤Method (1) for Producing Precursor for Lithium Secondary Battery Positive Electrode Active Materials>

A method (1) for producing a precursor for lithium secondary battery positive electrode active materials of the present embodiment includes a slurry preparation step of supplying a metal-containing aqueous solution containing at least nickel and an alkaline aqueous solution to a reaction vessel to obtain a hydroxide-containing slurry and a classification step of classifying the hydroxide-containing slurry using a screen. Hereinafter, "the method (1) for producing a precursor for lithium secondary battery positive electrode active materials" will be referred to as "the method (1) for producing a precursor". The method (1) for producing a precursor makes it possible to produce a precursor that satisfies the formula (1).

In detail, a compound containing Ni, which is an essential metal, and an optional metal element (one or more metal elements selected from the group consisting of Co, Zr, Al, Ti, Mn, Ga, In, and W) can be obtained.

The method (1) for producing a precursor preferably includes a slurry preparation step, a classification step, and an optional reflux step in this order. Hereinafter, each step will be described.

[Slurry Preparation Step]

The slurry preparation step is a step of supplying a metal-containing aqueous solution containing at least nickel and an alkaline aqueous solution to a reaction vessel to obtain a hydroxide-containing slurry.

In the present step, a metal-containing aqueous solution and an alkaline aqueous solution are continuously supplied to a reaction vessel and reacted together while being stirred to obtain a hydroxide-containing slurry. At this time, an aqueous solution containing an ammonium ion donor may be supplied. The present step will be described using a hydroxide slurry containing nickel, cobalt, manganese, and aluminum as an example of the hydroxide-containing slurry.

First, a nickel salt solution, a cobalt salt solution, a manganese salt solution, an aluminum salt solution, and a complexing agent are reacted together by a continuous co-precipitation method described in Japanese Unexamined Patent Application, First Publication No. 2002-201028, and a metal-containing aqueous solution containing a metal composite hydroxide represented by $Ni_sCo_tMn_uAl_v(OH)_2$ (in the formula, s+t+u+v=1) is produced.

A nickel salt that is a solute of the nickel salt solution is not particularly limited, and, for example, any of nickel sulfate, nickel nitrate, nickel chloride, and nickel acetate can be used.

As a cobalt salt that is a solute of the cobalt salt solution, for example, any of cobalt sulfate, cobalt nitrate, cobalt chloride, and cobalt acetate can be used.

As a manganese salt that is a solute of the manganese salt solution, for example, any of manganese sulfate, manganese nitrate, manganese chloride, and manganese acetate can be used.

As an aluminum salt that is a solute of the aluminum salt solution, for example, aluminum sulfate, sodium aluminate, or the like can be used.

The above-described metal salts are used in fractions corresponding to the composition ratio of $Ni_sCo_tMn_uAl_v(OH)_2$ described above.

That is, the metal salts are used in amounts that cause the mole ratio of nickel, which is the solute of the nickel salt solution, cobalt, which is the solute of the cobalt salt solution, manganese, which is the solute of the manganese salt solution, and aluminum, which is the solute of the aluminum salt solution to become s:t:u:v in accordance with the composition ratio of $Ni_sCo_tMn_uAl_v(OH)_2$. In addition, the solvents of the nickel salt solution, the cobalt salt solution, the manganese salt solution, and the aluminum salt solution are water.

The complexing agent is an agent capable of form a complex with a nickel ion, a cobalt ion, and a manganese ion in an aqueous solution.

As the complexing agent, ammonium ion donors (ammonium sulfate, ammonium chloride, ammonium carbonate, ammonium fluoride, and the like), hydrazine, ethylenediaminetetraacetic acid, nitrilotriacetic acid, uracildiacetic acid, and glycine are exemplary examples.

In the slurry adjustment step, the complexing agent may or may not be used. In a case where the complexing agent is used, regarding the amount of the complexing agent that is contained in the liquid mixture containing the nickel salt solution, the optional metal salt solution, and the complexing agent, for example, the mole ratio of the complexing agent to the sum of the mole numbers of the metal salts is more than 0 and 2.0 or less. In the present embodiment, regarding the amount of the complexing agent that is contained in the liquid mixture containing the nickel salt solution, the cobalt salt solution, the manganese salt solution, and the complexing agent, for example, the mole ratio of the complexing agent to the sum of the mole numbers of the metal salts is more than 0 and 2.0 or less.

At the time of the slurry preparation step, in order to adjust the pH value of the liquid mixture containing the nickel salt solution, the optional metal salt solution, and the complexing agent, an alkali metal hydroxide is added to the liquid mixture before the pH of the liquid mixture turns from alkaline into neutral. The alkali metal hydroxide is, for example, sodium hydroxide or potassium hydroxide.

The value of pH in the present specification is defined as a value measured when the temperature of the liquid mixture is 40° C. The pH of the liquid mixture is measured when the temperature of the liquid mixture sampled from the reaction vessel reaches 40° C.

The pH of the liquid mixture is preferably 10 or higher and 13 or lower and more preferably 11.5 or higher and 11.9 or lower when the liquid temperature of the aqueous solution is measured at 40° C.

When not only the nickel salt solution, the cobalt salt solution, the manganese salt solution, and the aluminum salt solution but also the complexing agent are continuously supplied to the reaction vessel, nickel, cobalt, manganese, and aluminum react together, thereby generating $Ni_sCo_tMn_uAl_v(OH)_2$.

At the time of the reaction, the temperature of the reaction vessel is controlled within a range of, for example, 20° C. or higher and 80° C. or lower and preferably 30° C. to 70° C.

The inside of the reaction vessel may be an inert atmosphere. An inert atmosphere inside the reaction vessel suppresses, among the metals that are contained in the liquid mixture, a metal that is more easily oxidized than nickel being aggregated earlier than nickel. Therefore, it is possible to obtain a uniform precursor.

In addition, the inside of the reaction vessel may be an appropriate oxidizing atmosphere. The oxidizing atmosphere may be an oxygen-containing atmosphere formed by mixing an oxidizing gas into an inert gas or an oxidizing agent may be present in an inert gas atmosphere. When the inside of the reaction vessel is an appropriate oxidizing atmosphere, a transition metal that is contained in the liquid mixture is appropriately oxidized, which makes it easy to control the form of the precursor.

As oxygen or the oxidizing agent in the oxidizing atmosphere, a sufficient number of oxygen atoms need to be present in order to oxidize the transition metal.

In a case where the oxidizing atmosphere is an oxygen-containing atmosphere, the atmosphere in the reaction vessel can be controlled by a method such as the aeration of an oxidizing gas into the reaction vessel or the bubbling of an oxidizing gas in the liquid mixture.

An increase in the amount of the transition metal oxidized increases the specific surface area.

In addition, in order to accelerate the crystal growth of the precursor by the oxidation of the transition metal element while enhancing the uniformity in the reaction vessel, the solution is preferably stirred with a stirring blade installed in the reaction vessel. The specific surface area, particle shape, particle size distribution, and the like of the precursor can be controlled by adjusting the stirring speed. As an example, the stirring speed is preferably set to 300 rpm or faster and 2000 rpm or slower while the stirring speed depends on the size of the reaction vessel.

[Classification Step]

The present step is a step of classifying the hydroxide-containing slurry produced in the slurry preparation step using a screen. The hydroxide-containing slurry is continuously drawn out from the reaction vessel and classified with a classification device including a screen. The classification device collects particles that have not passed through the screen as target particles and refluxes the slurry containing particles that have passed through the screen to the reaction vessel. At this time, the classification device may have an inclination angle with respect to the horizontal direction, and the inclination angle is preferably adjusted in order to prevent particles that fail to reach the target particle diameter from being mixed into the target particles. In addition, the slurry containing the particles that have passed through the screen may be refluxed to the reaction vessel after the concentration is appropriately adjusted.

The particles that have failed to reach the target particle diameter and returned to the reaction vessel are grown again in the reaction vessel, then, guided to the classification device from the reaction vessel, and discharged to the outside of the reaction vessel if the particles reach the target particle diameter.

The above-described operation is repeated, whereby particles that fail to reach the target particle diameter are generated again in the reaction vessel, and target particles that have not passed through the screen are selectively discharged to the outside of the reaction vessel. At the same time, it is possible to grow particles that fail to reach the target particle diameter repeatedly until the target particle diameter is reached. This makes it easy to uniform particle diameters in the precursor to be finally obtained and makes it possible to adjust the particle size distribution to a desired range.

In the present step, a classification device including a screen is used. As such a classification device, a slurry screener including a fixed screen and a screw that is rotatable in the screen is preferable.

The material of the screen is preferably a polymer material. As the polymer material, a cellulose acetate polymer, polysulfone, polyethersulfone, polyacrylonitrile, polyether, fluorine-based polymer, polyamide, polyimide, polyethylene, polypropylene, and the like are exemplary examples.

In the case of using a slurry screener including a screw that is rotatable in a fixed screen as the classification device in the classification step, the screw is preferably rotated at a circumferential velocity of 1.0 m/second or faster and 10.0 m/second or slower.

It is possible to control Dmin of the precursor to be produced by adjusting the sieve opening of the screen to be used.

[Reflux Step]

The reflux step is a step of returning (refluxing) the slurry containing particles that have failed to reach the target particle diameter and are classified with the classification device in the classification step to the inside of the reaction vessel. The reflux method is not particularly limited, and well-known means can be used. For example, in the case of returning the slurry containing classified particles that have failed to reach the target particle diameter as it is to the reaction vessel, the slurry may be returned to the reaction vessel with a pump directly or after being condensed.

The reflux speed, that is, the speed at which the slurry containing particles that have failed to reach the target particle diameter is returned to the reaction vessel may be adjusted depending on the supply speed of the raw material aqueous solution, the aqueous solution containing the ammonium ion donor, or the like.

≤Method (2) for Producing Precursor for Lithium Secondary Battery Positive Electrode Active Materials>

A method (2) for producing a precursor for lithium secondary battery positive electrode active materials of the present embodiment includes a slurry preparation step of supplying a metal-containing aqueous solution containing at least nickel and an alkaline aqueous solution to a reaction vessel to obtain a hydroxide-containing slurry and a classification step of classifying the hydroxide-containing slurry using a liquid cyclone-type classification device. The classification step is carried out under a condition that the classification device inlet pressure is 0.01 MPa or more and 0.07 MPa or less. Hereinafter, "the method (2) for producing a precursor for lithium secondary battery positive electrode active materials" will be referred to as "the method (2) for producing a precursor". The method (2) for producing a precursor makes it possible to produce a precursor that satisfies the formula (1).

The method (2) for producing a precursor preferably includes a slurry preparation step, a classification step, and an optional reflux step in this order. Hereinafter, the descriptions of the slurry preparation step and the reflux step are the same as the descriptions in the method (1) for producing a precursor. The classification step in the method (2) for producing a precursor will be described.

[Classification Step]

In the present step, a liquid cyclone-type classification device is used. According to the liquid cyclone-type classification device, it is possible to easily control the classification point with the shape and size of a cyclone portion and the introduction pressure of the slurry to be treated. The hydroxide-containing slurry is continuously drawn out from the reaction vessel, stored in a slurry storage tank, and classified into a large-particle diameter portion and a small-particle diameter portion with the liquid cyclone-type classification device. The classification device collects the large-particle diameter portion as target particles and continuously refluxes the small-particle diameter portion to the reaction vessel as particles that have failed to reach the target particle diameter. At this time, the slurry in the slurry storage tank may be continuously refluxed to the reaction vessel while being appropriately dehydrated.

As the operation condition of the liquid cyclone-type classification device, the classification device inlet pressure is adjusted so as to be 0.01 MPa or more and 0.07 MPa or less.

In the present embodiment, the inlet pressure of the classification device is preferably 0.01 MPa or more and 0.06 MPa or less and more preferably 0.01 MPa or more and 0.05 MPa or less.

In a case where the method (1) or (2) for producing a precursor includes the reflux step, it is possible to produce grown particles using particles that have failed to reach the target particle diameter as nuclei. Therefore, it is possible to produce the precursor without wasting the raw material metals.

The precursor that is produced by the method (1) or (2) for producing a precursor has a small amount of an impurity such as silicon. The reason therefor is considered as described below.

The precursor that is produced by the method (1) or (2) for producing a precursor has a specific particle size distribution. Therefore, it is considered that it becomes difficult for an impurity such as silicon that is contained in washing water to be used in a dehydration step to be adsorbed to the precursor.

The method (1) or (2) for producing a precursor may include a dehydration step and a drying step, which will be described below, or may include a heating step described below.

[Dehydration Step]

The precursor obtained after the classification step is washed and then dried to isolate a precursor hydroxide as a nickel cobalt manganese aluminum composite compound.

The precursor hydroxide is preferably isolated by a method in which a slurry containing the precursor hydroxide (co-precipitate slurry) is dehydrated by centrifugation, suction filtration, or the like.

The precursor hydroxide obtained by the dehydration is preferably washed with water or a washing liquid containing an alkali. In the present embodiment, the precursor hydroxide is preferably washed with a washing liquid containing an alkali and more preferably washed with a sodium hydroxide solution or a potassium hydroxide solution. In addition, the precursor hydroxide may be washed using a washing liquid containing a sulfur element.

[Drying Step]

The precursor hydroxide obtained by the dehydration step is dried in the atmospheric atmosphere at 105° C. or higher and 200° C. or lower for 10 hours or longer and 20 hours or shorter.

In the above-described example, the nickel cobalt manganese aluminum composite hydroxide is produced, but a nickel cobalt manganese aluminum composite oxide may be prepared.

[Heating Step]

The precursor obtained in the classification step or the precursor obtained in the drying step is preferably heated within a temperature range of 300° C. or higher and 900° C. or lower in an oxygen-containing atmosphere.

The heating step makes it possible to stabilize the composition ratio between lithium in a lithium composite metal compound to be produced and the metal elements in the case of mixing the precursor with a lithium compound.

Regarding the heating time, the total time taken while the temperature begins to be raised and reaches the heating temperature and the holding of the precursor at the heating temperature ends is preferably set to one hour or longer and 30 hours or shorter. The temperature rising rate in the heating step until the highest holding temperature is reached is preferably 180° C./hour or faster, more preferably 200° C./hour or faster, and particularly preferably 250° C./hour or faster.

The heating temperature is preferably 350° C. or higher and 800° C. or lower and more preferably 400° C. or higher and 700° C. or lower. When the heating temperature is the above-described lower limit value or higher, it is possible to suppress the hydroxide remaining in the precursor. When the heating temperature is the above-described upper limit value or lower, it is possible to suppress sintering between the particles of the precursor and to keep the particle size distribution uniform.

The highest holding temperature in the present specification is the highest temperature of the holding temperature of the atmosphere in a calcining furnace in a calcining step and means the calcining temperature in the calcining step. In the case of a main calcining step having a plurality of heating steps, the highest holding temperature means the highest temperature in each heating step.

The temperature rising rate in the present specification is calculated from the time taken while the temperature begins to be raised and reaches the highest holding temperature in a calcining device and a temperature difference between the temperature in the calcining furnace of the calcining device at the time of beginning to raise the temperature and the highest holding temperature.

Aspects of the method (1) for producing a precursor or the method (2) for producing a precursor of the present embodiment will be exemplified.

(i) A precursor that satisfies the formula (1) can be produced by one aspect of the method (1) for producing a precursor or the method (2) for producing a precursor of the present embodiment.

(ii) A precursor that satisfies the formula (1) and is represented by the composition formula (A) can be produced by one aspect of the method (1) for producing a precursor or the method (2) for producing a precursor of the present embodiment.

(iii) A precursor that satisfies the formula (1) and satisfies the formula (4) can be produced by one aspect of the method (1) for producing a precursor or the method (2) for producing a precursor of the present embodiment.

(iv) A precursor that satisfies the formula (1), satisfies the formula (4), and is represented by the composition formula (A) can be produced by one aspect of the method 1) for producing a precursor or the method (2) for producing a precursor of the present embodiment.

≤Method for Producing Lithium Composite Metal Compound>

The present embodiment is a method for producing a lithium composite metal compound having a mixing step of mixing the precursor obtained by the method (1) for producing a precursor or the method (2) for producing a precursor and a lithium compound and a calcining step of calcining the obtained mixture in an oxygen-containing atmosphere at a temperature of 500° C. or higher and 1000° C. or lower.

[Mixing Step]

The present step is a step of mixing the precursor and a lithium compound to obtain a mixture.

Lithium Compound

As the lithium compound that is used in the present embodiment, it is possible to use any one of lithium carbonate, lithium nitrate, lithium acetate, lithium hydroxide, lithium oxide, lithium chloride, and lithium fluoride or a mixture of two or more thereof. Among these, any one or both of lithium hydroxide and lithium carbonate is preferable.

The method for mixing the precursor of the present embodiment and the lithium compound will be described.

The precursor and the lithium compound are mixed in consideration of the composition ratio of a final target product. For example, in the case of using a nickel cobalt manganese aluminum composite hydroxide as the precursor, the lithium compound and the precursor are mixed in fractions that correspond to the composition ratio of $Li[Li_r(Ni_sCo_tMn_uAl_v)_{1-r}]O_2$ (in the formula, s+t+u+v=1). The mixture of the precursor and the lithium compound is calcined in the subsequent calcining step, whereby a lithium-nickel cobalt manganese aluminum composite oxide is obtained.

[Calcining Step]

A lithium composite metal compound is obtained by calcining the mixture of the precursor of the present embodiment and the lithium compound.

In the calcining, a dry air, an oxygen atmosphere, an inert atmosphere, or the like is used depending on a desired composition, and a plurality of heating steps is carried out as necessary.

The holding temperature in the calcining may be appropriately adjusted.

As the holding temperature, specifically, a range of 200° C. or higher and 1150° C. or lower is an exemplary example, and the holding temperature is preferably 300° C. or higher and 1050° C. or lower, more preferably 500° C. or higher and 1000° C. or lower, and particularly preferably 650° C. or higher and 950° C. or lower.

When the calcining temperature is set within a range of 650° C. or higher and 950° C. or lower, it is possible to produce a lithium nickel composite oxide that exhibits a particularly high charge and discharge efficiency and has excellent cycle characteristics. Regarding the calcining time, the total time taken while the temperature begins to be raised and reaches the firing temperature and the holding of the mixture at the firing temperature ends is preferably set to one hour or longer and 30 hours or shorter. When the total time is 30 hours or shorter, it is possible to prevent the volatilization of Li and to prevent the deterioration of the battery performance.

When the total time is one hour or longer, the development of crystals favorably proceeds, and it is possible to improve the battery performance.

In addition, as the time during which the mixture is held at the holding temperature, 0.1 hour or longer and 20 hours or shorter is an exemplary example, and 0.5 hours or longer and 10 hours or shorter is preferable. The temperature rising rate up to the holding temperature is usually 50° C./hour or faster and 400° C./hour or slower, and the temperature lowering rate from the holding temperature to room temperature is usually 10° C./hour or faster and 400° C./hour or slower. In addition, as the atmosphere for the calcining, it is possible to use the atmosphere, oxygen, nitrogen, argon or a gas mixture thereof.

A lithium composite metal compound obtained by the calcining is pulverized, then, appropriately sieved, and thereby made into a lithium secondary battery positive electrode active material applicable to lithium secondary batteries.

≤Lithium Secondary Battery>

Next, a positive electrode for which a lithium secondary battery positive electrode active material for which the lithium composite metal compound that is produced by the present embodiment is used is used as a positive electrode active material for lithium secondary batteries and a lithium secondary battery having this positive electrode will be described while describing the configuration of the lithium secondary battery.

An example of the lithium secondary battery of the present embodiment has a positive electrode, a negative electrode, a separator that is sandwiched between the positive electrode and the negative electrode, and an electrolytic solution that is disposed between the positive electrode and the negative electrode.

Figure 1B:
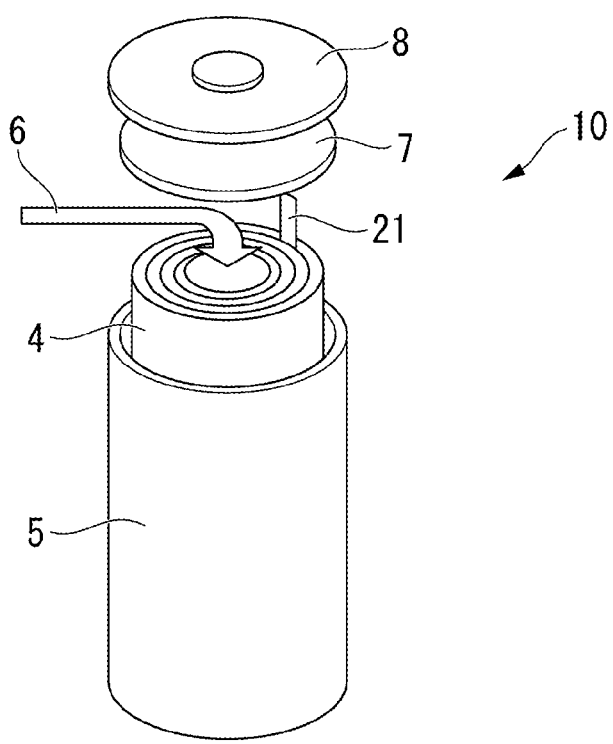
FIG. 1B is a schematic configuration view showing the example of the lithium-ion secondary battery.

FIG. 1A and FIG. 1B are schematic views illustrating an example of the lithium secondary battery of the present embodiment. A cylindrical lithium secondary battery 10 of the present embodiment is produced as described below.

First, as shown in FIG. 1A, a pair of separators 1 having a strip shape, a strip-shaped positive electrode 2 having a positive electrode lead 21 at one end, and a strip-shaped negative electrode 3 having a negative electrode lead 31 at one end are laminated in the order of the separator 1, the positive electrode 2, the separator 1, and the negative electrode 3 and are wound to form an electrode group 4.

Next, as shown in FIG. 1B, the electrode group 4 and an insulator (not shown) are accommodated in a battery can 5, then, the can bottom is sealed, the electrode group 4 is impregnated with an electrolytic solution 6, and an electrolyte is disposed between the positive electrode 2 and the negative electrode 3. Furthermore, the upper portion of the battery can 5 is sealed with a top insulator 7 and a sealing body 8, which makes it possible to produce a lithium secondary battery 10.

As the shape of the electrode group 4, a columnar shape in which the cross-sectional shape becomes a circle, an ellipse, a rectangle, or a rectangle with rounded corners when the electrode group 4 is cut in a direction perpendicular to the winding axis is an exemplary example.

In addition, as the shape of a lithium secondary battery having such an electrode group 4, a shape that is specified by IEC60086, which is a standard for batteries specified by the International Electrotechnical Commission (IEC) or by JIS C 8500 can be adopted. Shapes such as a cylindrical shape and a square shape can be exemplary examples.

Furthermore, the lithium secondary battery is not limited to the winding-type configuration and may have a lamination-type configuration in which the laminated structure of the positive electrode, the separator, the negative electrode, and the separator is repeatedly overlaid. As the lamination-type lithium secondary battery, it is possible to exemplify a so-called coin-type battery, a button-type battery, and a paper-type (or sheet-type) battery.

Hereinafter, each configuration will be described in order.

(Positive Electrode)

The positive electrode of the present embodiment can be produced by, first, adjusting a positive electrode mixture containing a positive electrode active material, a conductive material, and a binder and supporting the positive electrode mixture by a positive electrode current collector.

(Conductive Material)

As the conductive material in the positive electrode of the present embodiment, a carbon material can be used. As the carbon material, graphite powder, carbon black (for example, acetylene black), a fibrous carbon material, and the like can be exemplary examples. Since carbon black is fine particles and has a large surface area, the addition of a small amount of carbon black to the positive electrode mixture enhances the conductive property in the positive electrode and makes it possible to improve the charge and discharge efficiency and the output characteristics. However, when an excess of carbon black is added, both the binding force between the positive electrode mixture and the positive electrode current collector attributed to the binder and the binding force inside the positive electrode mixture deteriorate, which, conversely, acts as a cause for an increase in the internal resistance.

The fraction of the conductive material in the positive electrode mixture is preferably 5 parts by mass or more and 20 parts by mass or less with respect to 100 parts by mass of the positive electrode active material. In the case of using a fibrous carbon material such as a graphitized carbon fiber or a carbon nanotube as the conductive material, it is also possible to decrease the fraction.

(Binder)

As the binder in the positive electrode of the present embodiment, a thermoplastic resin can be used.

As the thermoplastic resin, fluororesins such as polyvinylidene fluoride (hereinafter, referred to as PVdF in some cases), polytetrafluoroethylene (hereinafter, referred to as PTFE in some cases), tetrafluoroethylene-hexafluoropropylene-vinylidene fluoride-based copolymers, hexafluoropropylene-vinylidene fluoride-based copolymers, and tetrafluoroethylene-perfluorovinyl ether-based copolymers; and polyolefin resins such as polyethylene and polypropylene can be exemplary examples.

Two or more of these thermoplastic resins may be used in a mixture form. When a fluororesin and a polyolefin resin are used as the binder, the fraction of the fluororesin in the entire positive electrode mixture is set to 1 mass % or more and 10 mass % or less, and the fraction of the polyolefin resin is set to 0.1 mass % or more and 2 mass % or less, it is possible to obtain a positive electrode mixture having both a high adhesive force to the positive electrode current collector and a high bonding force in the positive electrode mixture.

(Positive Electrode Current Collector)

As the positive electrode current collector in the positive electrode of the present embodiment, a strip-shaped member formed of a metal material such as Al, Ni, or stainless steel as a forming member can be used. Particularly, a positive electrode current collector that is formed of Al and has a thin film shape is preferable since the positive electrode current collector is easy to process and inexpensive.

As the method for supporting the positive electrode mixture by the positive electrode current collector, a method in which the positive electrode mixture is formed by pressurization on the positive electrode current collector is an exemplary example. In addition, the positive electrode mixture may be supported by the positive electrode current collector by preparing a paste of the positive electrode mixture using an organic solvent, applying and drying the paste of the positive electrode mixture to be obtained on at least one surface side of the positive electrode current collector, and fixing the positive electrode mixture by pressing.

As the organic solvent that can be used in the case of preparing the paste of the positive electrode mixture, an amine-based solvent such as N,N-dimethylaminopropylamine or diethylenetriamine; an ether-based solvent such as tetrahydrofuran; a ketone-based solvent such as methyl ethyl ketone; an ester-based solvent such as methyl acetate; and an amide-based solvent such as dimethylacetamide or N-methyl-2-pyrrolidone (hereinafter, referred to as NMP in some cases) are exemplary examples.

As the method for applying the paste of the positive electrode mixture to the positive electrode current collector, a slit die coating method, a screen coating method, a curtain coating method, a knife coating method, a gravure coating method, and an electrostatic spraying method are exemplary examples.

The positive electrode can be produced by the method exemplified above.

(Negative Electrode)

The negative electrode in the lithium secondary battery of the present embodiment preferably can be doped with a lithium ion and discharge the lithium ion at a lower potential than the positive electrode, and an electrode formed by supporting a negative electrode mixture containing a negative electrode active material by a negative electrode current collector and an electrode formed of a negative electrode active material alone can be exemplary examples.

(Negative Electrode Active Material)

As the negative electrode active material in the negative electrode, materials that are a carbon material, a chalcogen compound (oxide, sulfide, or the like), a nitride, a metal, or an alloy and can be doped with a lithium ion and discharge the lithium ion at a lower potential than the positive electrode are exemplary examples.

As the carbon material that can be used as the negative electrode active material, graphite such as natural graphite and artificial graphite, cokes, carbon black, pyrolytic carbons, carbon fibers, and organic polymer compound-calcined bodies are exemplary examples.

As the oxide that can be used as the negative electrode active material, oxides of silicon represented by a formula $SiO_x$ (here, x is a positive real number) such as $SiO_2$ and SiO; oxides of titanium represented by a formula $TiO_x$ (here, x is a positive real number) such as $TiO_2$ and TiO; oxides of vanadium represented by a formula $VO_x$ (here, x is a positive real number) such as $V_2O_5$ and $VO_2$; oxides of iron represented by a formula $FeO_x$ (here, x is a positive real number) such as $Fe_3O_4$, $Fe_2O_3$, and FeO; oxides of tin represented by a formula $SnO_x$ (here, x is a positive real number) such as $SnO_2$ and SnO; oxides of tungsten represented by a general formula $WO_x$ (here, x is a positive real number) such as $WO_3$ and $WO_2$; and composite metal oxides containing lithium and titanium or vanadium such as $Li_4Ti_5O_{12}$ and $LiVO_2$ can be exemplary examples.

As the sulfide that can be used as the negative electrode active material, sulfides of titanium represented by a formula $TiS_x$ (here, x is a positive real number) such as $Ti_2S_3$, $TiS_2$, and TiS; sulfides of vanadium represented by a formula $VS_x$ (here, x is a positive real number) such $V_3S_4$, $VS_2$, and VS; sulfides of iron represented by a formula $FeS_x$ (here, x is a positive real number) such as $Fe_3S_4$, $FeS_2$, and FeS; sulfides of molybdenum represented by a formula $MoS_x$ (here, x is a positive real number) such as $Mo_2S_3$ and $MoS_2$; sulfides of tin represented by a formula $SnS_x$ (here, x is a positive real number) such as $SnS_2$ and SnS; sulfides of tungsten represented by a formula $WS_x$ (here, x is a positive real number) such as $WS_2$; sulfides of antimony represented by a formula $SbS_x$ (here, x is a positive real number) such as $Sb_2S_3$; and sulfides of selenium represented by a formula $SeS_x$ (here, x is a positive real number) such as $Se_5S_3$, $SeS_2$, and SeS can be exemplary examples.

As the nitride that can be used as the negative electrode active material, lithium-containing nitrides such as $Li_3N$ and $Li_{3-x}A_xN$ (here, A is any one or both of Ni and Co, and $0 \leq x \leq 3$) can be exemplary examples.

These carbon materials, oxides, sulfides, and nitrides may be used singly or two or more kinds thereof may be jointly used. In addition, these carbon materials, oxides, sulfides, and nitrides may be crystalline or amorphous.

In addition, as the metal that can be used as the negative electrode active material, lithium metal, silicon metal, tin metal, and the like can be exemplary examples.

As the alloy that can be used as the negative electrode active material, lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$ can be exemplary examples.

These metals and alloys can be used as an electrode, mainly, singly after being processed into, for example, a foil shape.

Among the above-described negative electrode active materials, the carbon material containing graphite such as natural graphite or artificial graphite as a main component is preferably used for the reason that the potential of the negative electrode rarely changes (the potential flatness is favorable) from a uncharged state to a fully-charged state during charging, the average discharging potential is low, the capacity retention rate at the time of repeatedly charging and discharging the lithium secondary battery is high (the cycle characteristics are favorable), and the like. The shape of the carbon material may be, for example, any of a flaky shape such as natural graphite, a spherical shape such as mesocarbon microbeads, a fibrous shape such as a graphitized carbon fiber, or an aggregate of fine powder.

The negative electrode mixture may contain a binder as necessary. As the binder, a thermoplastic resin can be an exemplary example, and specifically, PVdF, thermoplastic polyimide, carboxymethylcellulose, polyethylene, and polypropylene can be exemplary examples.

(Negative Electrode Current Collector)

As the negative electrode current collector in the negative electrode, a strip-shaped member formed of a metal material such as Cu, Ni, or stainless steel as the forming material can be an exemplary example. Particularly, a negative electrode current collector that is formed of Cu and has a thin film shape is preferable since the negative electrode current collector does not easily produce an alloy with lithium and is easy to process.

As the method for supporting the negative electrode mixture by the negative electrode current collector, similarly to the case of the positive electrode, a method in which the negative electrode mixture is formed by pressurization and a method in which a paste of the negative electrode mixture is prepared using a solvent or the like, applied and dried on the negative electrode current collector, and then the negative electrode mixture is compressed by pressing are exemplary examples.

(Separator)

As the separator in the lithium secondary battery of the present embodiment, it is possible to use, for example, a material that is made of a material such as a polyolefin resin such as polyethylene or polypropylene, a fluororesin, or a nitrogen-containing aromatic polymer and has a form such as a porous film, a non-woven fabric, or a woven fabric. In addition, the separator may be formed using two or more of these materials or the separator may be formed by laminating these materials.

In the present embodiment, the air resistance of the separator by the Gurley method specified by JIS P 8117 is preferably 50 sec/100 cc or more and 300 sec/100 cc or less and more preferably 50 sec/100 cc or more and 200 sec/100 cc or less in order to favorably permeate the electrolyte while the battery is in use (while the battery is being charged and discharged).

In addition, the porosity of the separator is preferably 30 vol % or more and 80 vol % or less and more preferably 40 vol % or more and 70 vol % or less. The separator may be a laminate of separators having different porosities.

(Electrolytic Solution)

The electrolytic solution in the lithium secondary battery of the present embodiment contains an electrolyte and an organic solvent.

As the electrolyte that is contained in the electrolytic solution, lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB (here, BOB represents bis(oxalato)borate), LiFSI (here, FSI represents bis(fluorosulfonyl)imide), lower aliphatic carboxylic acid lithium salts, and $LiAlCl_4$ are exemplary examples, and a mixture of two or more of these electrolytes may be used. Among these, an electrolyte containing at least one selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$ that contain fluorine is preferably used as the electrolyte.

In addition, as the organic solvent that is contained in the electrolytic solution, it is possible to use, for example, carbonates such as propylene carbonate, ethylene carbonate, dimethyl carbonate, diethyl carbonate, ethyl methyl carbonate, 4-trifluoromethyl-1,3-dioxolan-2-one, and 1,2-di (methoxycarbonyloxy)ethane; ethers such as 1,2-dimethoxyethane, 1,3-dimethoxypropane, pentafluoropropyl methyl ether, 2,2,3,3,3-tetrafluoropropyl difluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propanesultone, or these organic solvents into which a fluoro group is further introduced (the organic solvents in which one or more hydrogen atoms in the organic solvent are substituted with a fluorine atom).

As the organic solvent, two or more of the above-described organic solvents are preferably used in a mixture form. Among these, a solvent mixture containing a carbonate is preferable, and a solvent mixture of a cyclic carbonate and a non-cyclic carbonate and a solvent mixture of a cyclic carbonate and an ether are still more preferable. As the solvent mixture of a cyclic carbonate and a non-cyclic carbonate, a solvent mixture containing ethylene carbonate, dimethyl carbonate, and ethyl methyl carbonate is preferable. The electrolytic solution for which such a solvent mixture is used has a number of features as follows: the electrolytic solution has a broad operating temperature range, does not easily deteriorate even when the lithium secondary battery is charged and discharged at a high current rate, does not easily deteriorate even after used for a long period of time, and does not easily dissolve even in a case where a graphite material such as natural graphite or artificial graphite is used as an active material for the negative electrode.

In addition, as the electrolytic solution, it is preferable to use an electrolytic solution containing a lithium salt containing fluorine such as $LiPF_6$ and an organic solvent having a fluorine substituent since the safety of lithium secondary batteries to be obtained is enhanced. A solvent mixture containing an ether having a fluorine substituent such as pentafluoropropyl methyl ether or 2,2,3,3-tetrafluoropropyl difluoromethyl ether and dimethyl carbonate is still more preferable since the capacity retention rate is high even when the lithium secondary battery is charged and discharged at a high current rate.

A solid electrolyte may be used instead of the electrolytic solution. As the solid electrolyte, it is possible to use, for example, an organic polymer electrolyte such as a polyethylene oxide-based polymer compound or a polymer compound containing at least one or more of a polyorganosiloxane chain or a polyoxyalkylene chain. In addition, it is also possible to use a so-called gel-type solid electrolyte in which a non-aqueous electrolytic solution is held in a polymer compound. In addition, inorganic solid electrolytes containing a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$ are exemplary examples, and a mixture or two or more thereof may be used. There is a case where the use of these solid electrolytes further enhances the safety of the lithium secondary battery.

In addition, in a case where the solid electrolyte is used in the lithium secondary battery of the present embodiment, there is also a case where the solid electrolyte plays a role of the separator, and in such a case, the separator is not required in some cases.

Since the lithium composite metal compound that is produced by the above-described present embodiment is used in the positive electrode active material having the above-described configuration, it is possible to improve the cycle retention rate of the lithium secondary battery for which the positive electrode active material is used.

In addition, since the positive electrode having the above-described configuration has the lithium secondary battery positive electrode active material having the above-described configuration, it is possible to improve the cycle retention rate of the lithium secondary battery.

Furthermore, the lithium secondary battery having the above-described configuration has the above-described positive electrode and thus becomes a secondary battery having a high cycle retention rate.

EXAMPLES

Next, the present invention will be described in more detail using examples.

≤Composition Analysis>

The composition analysis of the powder of an obtained precursor was carried out by dissolving the powder of the obtained precursor in hydrochloric acid and then analyzing the composition using an inductively coupled plasma emission spectrometer (Optima 7300, manufactured by PerkinElmer Co., Ltd.).

≤Measurement of BET Specific Surface Area>

The powder of the obtained precursor was dried in a nitrogen atmosphere at 105° C. for 30 minutes, and then the powder was measured using Macsorb (registered trademark) manufactured by Mountech Co., Ltd.

≤Measurement of Particle Size Distribution>

The cumulative volume particle size distribution of the precursor was measured by the laser diffraction scattering method.

As a particle size distribution measuring instrument, MICROTRAC MT3300EXII manufactured by Microtrac-Bell Corp. was used, and, regarding the measurement conditions, the cumulative volume particle size distribution was measured according to conditions shown in Table 1 below. In addition, in the obtained cumulative particle size distribution curve, the value of the particle diameter at a point at which the cumulative volume from the small particle side reaches 10% was defined as D10 (μm), the value of the particle diameter at a point at which the cumulative volume reaches 50% is D50 (μm), and the value of the particle diameter at a point at which the cumulative volume reaches 90% was defined as D90 (μm).

Furthermore, the particle size distribution was measured a plurality of times, median values were obtained from the data (n=5) of the minimum particle diameters and the maximum particle diameters that were each within a fluctuation error range of 10%, the value of the minimum particle diameter was defined as Dmin (μm), and the value of the maximum particle diameter was defined as Dmax (μm).

Table 1 below shows the measurement conditions for the particle size distributions of Examples 1 to 4 and Comparative Examples 1 to 3.

TABLE 1

| Conditions | |
| --- | --- |
| Dispersant | 10 mass % sodium hexametaphosphate aqueous solution 250 μL |
| Solvent | Ion exchange water 180 mL |
| Transmittance | 85 ± 5% |
| Specimen refractive index | 1.55 |
| Solvent refractive index | 1.33 |
| Ultrasonic wave at measurement | Ineffective |
| Circulation flow rate | 70% |
| Particle-transmitting property | Transmit |
| Particle shape | Non-spherical |
| Calculation mode | HRA |
| Particle diameter classification | HRA |
| Residue ratio set | Ineffective |

≤Powder X-Ray Diffraction Measurement>

Powder X-ray diffraction measurement was carried out using an X-ray diffractometer (Ultima IV manufactured by Rigaku Corporation). The powder of the precursor was loaded into a dedicated substrate, and the measurement was carried out using a Cu-Kα radiation source under conditions of a diffraction angle of 2θ=10° to 90°, a sampling width of 0.03°, and a scan speed of 20°/min, thereby obtaining a powder X-ray diffraction pattern.

The ratio of the half width α of a peak at 2θ=52.4±1° and the half width β of a peak at 2θ=73.9±1°, which were obtained by analyses using an integrated X-ray powder diffraction software PDXL (Rigaku Corporation).

Example 1

First, water was poured into a 500 L cylindrical reaction vessel including a stirrer including a 220φ propeller-type stirring blade and an overflow pipe.

Next, a 32 mass % sodium hydroxide solution was added thereto until the pH reached 11.8 (when measured at a liquid temperature of the aqueous solution of 40° C.), and the temperature was held at 55° C. with a heater.

Next, nitrogen gas was continuously blown into the reaction vessel at a flow rate of 5 L/min to make the atmosphere in the reaction vessel into an inert atmosphere.

A nickel sulfate aqueous solution and a cobalt sulfate aqueous solution were mixed together such that the atomic ratio between nickel atoms and cobalt atoms reached 89:11 to prepare a liquid raw material mixture, and a solution mixture was continuously supplied to the reaction vessel at a constant rate.

A 2.8 mol/L ammonium sulfate solution was used as a complexing agent and continuously supplied to the reaction vessel at a constant rate such that the ammonia concentration in the reaction vessel reached 0.47 mol/L. Furthermore, 32 mass % of sodium hydroxide was intermittently added thereto in order to maintain the pH of the solution in the reaction vessel at 11.8 (when measured at a liquid temperature of the aqueous solution of 40° C.).

A nickel cobalt composite hydroxide-containing slurry obtained by the above-described reaction was caused to overflow from the overflow pipe.

The slurry that had been caused to overflow was introduced into a wet-type classifier slurry screener (manufactured by ACO Japan Co., Ltd., SS90×250) and continuously classified by rotating a screw of the slurry screener at a circumferential velocity of 5.8 m/sec.

As a screen, a polyamide screen having 15 μm sieve openings was used.

Particles that failed to pass through the screen of the slurry screener were collected as the target particles of the nickel cobalt composite hydroxide. In addition, the slurry containing the particles of the nickel cobalt composite hydroxide that had passed through the screen was appropriately condensed and continuously refluxed to the reaction vessel. The classification was carried out with the slurry screener lifted so as to be inclined at 15° such that the collection port side of the target particles of the nickel cobalt composite hydroxide particles was positioned high.

The obtained nickel cobalt composite hydroxide was washed, dehydrated, then, dried at 105° C. for 20 hours, and sieved, and particle size distribution measurement, specific surface area measurement, chemical composition analysis, and powder X-ray diffraction measurement were carried out. The results are shown in Table 3.

Example 2

Water was poured into a 500 L cylindrical reaction vessel including a stirrer including a 220φ propeller-type stirring blade and an overflow pipe.

Next, a 32 mass % sodium hydroxide solution was added thereto until the pH reached 11.8 (when measured at a liquid temperature of the aqueous solution of 40° C.), and the temperature was held at 55° C. with a heater.

Next, nitrogen gas was continuously blown into the reaction vessel at a flow rate of 5 L/min to make the atmosphere in the reaction vessel into an inert atmosphere.

A nickel sulfate aqueous solution and a cobalt sulfate aqueous solution were mixed together such that the atomic ratio between nickel atoms and cobalt atoms reached 92.5:7.5 to prepare a liquid raw material mixture, and a solution mixture was continuously supplied to the reaction vessel at a constant rate.

A 2.8 mol/L ammonium sulfate solution was used as a complexing agent and continuously supplied to the reaction vessel at a constant rate such that the ammonia concentration in the reaction vessel reached 0.47 mol/L. Furthermore, 32 mass % of sodium hydroxide was intermittently added thereto in order to maintain the pH of the solution in the reaction vessel at 11.8 (when measured at a liquid temperature of the aqueous solution of 40° C.).

A nickel cobalt composite hydroxide-containing slurry obtained by the above-described reaction was caused to overflow from the overflow pipe.

The slurry that had been caused to overflow was introduced into a wet-type classifier slurry screener (manufactured by ACO Japan Co., Ltd., SS90×250) and continuously classified by rotating a screw of the slurry screener at a circumferential velocity of 5.8 m/sec.

As a screen, a polyamide screen having 15 μm sieve openings was used. Particles that failed to pass through the screen of the slurry screener were collected as the target particles of the nickel cobalt composite hydroxide. In addition, the slurry containing the particles of the nickel cobalt composite hydroxide that had passed through the screen was appropriately condensed and continuously refluxed to the reaction vessel.

The classification was carried out with the slurry screener lifted so as to be inclined at 15° such that the collection port side of the target particles of the nickel cobalt composite hydroxide was positioned high.

The obtained nickel cobalt composite hydroxide was washed, dehydrated, then, dried at 105° C. for 20 hours, and sieved, and particle size distribution measurement, specific surface area measurement, chemical composition analysis, and powder X-ray diffraction measurement were carried out. The results are shown in Table 3.

Example 3

Water was poured into a 500 L cylindrical reaction vessel including a stirrer including a 220φ propeller-type stirring blade and an overflow pipe.

Next, a 32 mass % sodium hydroxide solution was added thereto until the pH reached 11.6 (when measured at a liquid temperature of the aqueous solution of 40° C.), and the temperature was held at 45° C. with a heater.

Next, nitrogen gas was continuously blown into the reaction vessel at a flow rate of 5 L/min to make the atmosphere in the reaction vessel into an inert atmosphere.

A nickel sulfate aqueous solution and a cobalt sulfate aqueous solution were mixed together such that the atomic ratio between nickel atoms and cobalt atoms reached 92.5:7.5 to prepare a liquid raw material mixture, and a solution mixture was continuously supplied to the reaction vessel at a constant rate.

A 2.8 mol/L ammonium sulfate solution was used as a complexing agent and continuously supplied to the reaction vessel at a constant rate such that the ammonia concentration in the reaction vessel reached 0.47 mol/L. The flow rate of a 10.8 mass % aluminum sulfate aqueous solution was adjusted such that the atomic ratio among nickel atoms, cobalt atoms, and aluminum atoms reached 91.1:7.4:1.5. Furthermore, 32 mass % of sodium hydroxide was intermittently added thereto in order to maintain the pH of the solution in the reaction vessel at 11.6 (when measured at a liquid temperature of the aqueous solution of 40° C.).

A nickel cobalt aluminum composite hydroxide-containing slurry obtained by the above-described reaction was caused to overflow with the overflow pipe.

The slurry that had been caused to overflow was introduced into a wet-type classifier slurry screener (manufactured by ACO Japan Co., Ltd., SS90×250) and continuously classified by rotating a screw of the slurry screener at a circumferential velocity of 5.8 m/sec. As a screen, a polyamide screen having 15 µm sieve openings was used. Particles that failed to pass through the screen of the slurry screener were collected as the target nickel cobalt aluminum composite hydroxide particles. The slurry containing the nickel cobalt aluminum composite hydroxide particles that had passed through the screen was appropriately condensed and continuously refluxed to the reaction vessel.

The classification was carried out with the slurry screener lifted so as to be inclined at 15° such that the collection port side of the target nickel cobalt aluminum composite hydroxide particles was positioned high.

The obtained nickel cobalt aluminum composite hydroxide was washed, dehydrated, then, dried at 105° C. for 20 hours, and sieved, and particle size distribution measurement, specific surface area measurement, chemical composition analysis, and powder X-ray diffraction measurement were carried out. The results are shown in Table 3.

Example 4

Water was poured into a 500 L cylindrical reaction vessel including a stirrer including a 220φ propeller-type stirring blade and an overflow pipe.

Next, a 32 mass % sodium hydroxide solution was added thereto until the pH reached 11.2 (when measured at a liquid temperature of the aqueous solution of 40° C.), and the temperature was held at 50° C. with a heater.

Next, nitrogen gas was continuously blown into the reaction vessel at a flow rate of 5 L/min to make the atmosphere in the reaction vessel into an inert atmosphere.

A nickel sulfate aqueous solution and a cobalt sulfate aqueous solution were mixed together such that the atomic ratio between nickel atoms and cobalt atoms reached 93:7 to prepare a liquid raw material mixture, and a solution mixture was continuously supplied to the reaction vessel at a constant rate. A 2.8 mol/L ammonium sulfate solution was used as a complexing agent and continuously supplied to the reaction vessel at a constant rate such that the ammonia concentration in the reaction vessel reached 0.29 mol/L. Furthermore, 32 mass % of sodium hydroxide was intermittently added thereto in order to maintain the pH of the solution in the reaction vessel at 11.2 (when measured at a liquid temperature of the aqueous solution of 40° C.).

A nickel cobalt composite hydroxide-containing slurry obtained by the above-described reaction was stored in a slurry storage tank from the overflow pipe.

The nickel cobalt composite hydroxide-containing slurry stored in the slurry storage tank was introduced into a wet-type classifier liquid cyclone (manufactured by Murata Kogyo Co., Ltd., T-10B-1 type) at a liquid cyclone inlet pressure of 0.04 MPa, and the nickel cobalt composite hydroxide was classified into a large-particle diameter portion and a small-particle diameter portion.

The large-particle diameter portion was collected as the target particles of the nickel cobalt composite hydroxide, and the small-particle diameter portion was continuously refluxed to the reaction vessel as the particles of the nickel cobalt composite hydroxide that had failed to reach the target particle diameter.

Furthermore, the nickel cobalt composite hydroxide-containing slurry that was present in the slurry storage tank was continuously refluxed to the reaction vessel while being appropriately dehydrated.

Particles that were discharged from a liquid cyclone bottom were collected as the target particles of the nickel cobalt composite hydroxide, and the slurry containing the particles of the nickel cobalt composite hydroxide discharged from a liquid cyclone top was continuously refluxed to the reaction vessel.

Furthermore, the nickel cobalt composite hydroxide-containing slurry was appropriately condensed from the slurry storage tank to the reaction vessel and continuously refluxed to the reaction vessel.

The obtained nickel cobalt composite hydroxide was washed, dehydrated, then, dried at 105° C. for 20 hours, and sieved, and particle size distribution measurement, specific surface area measurement, chemical composition analysis, and powder X-ray diffraction measurement were carried out. The results are shown in Table 3.

Comparative Example 1

Water was poured into a 2000 L cylindrical reaction vessel including a stirrer including a 350φ propeller-type stirring blade and an overflow pipe.

Next, a 32 mass % sodium hydroxide solution was added thereto until the pH reached 11.9 (when measured at a liquid temperature of the aqueous solution of 40° C.), and the temperature was held at 45° C. with a heater. Next, nitrogen gas was continuously blown into the reaction vessel at a flow rate of 5 L/min to make the atmosphere in the reaction vessel into an inert atmosphere.

A nickel sulfate aqueous solution and a cobalt sulfate aqueous solution were mixed together such that the atomic ratio between nickel atoms and cobalt atoms reached 92.5:7.5 to prepare a liquid raw material mixture, and a solution mixture was continuously supplied to the reaction vessel at a constant rate.

A 2.8 mol/L ammonium sulfate solution was used as a complexing agent and continuously supplied to the reaction vessel at a constant rate such that the ammonia concentration in the reaction vessel reached 0.47 mol/L. The flow rate of an aluminum sulfate aqueous solution was adjusted such that the atomic ratio among nickel atoms, cobalt atoms, and aluminum atoms reached 91.1:7.4:1.5.

Furthermore, 32 mass % of sodium hydroxide was intermittently added thereto in order to maintain the pH of the solution in the reaction vessel at 11.9 (when measured at a liquid temperature of the aqueous solution of 40° C.).

A nickel cobalt composite hydroxide-containing slurry obtained by the above-described reaction was caused to overflow from the overflow pipe, and the slurry that had been caused to overflow was regarded as the target particles of the nickel cobalt composite hydroxide.

The obtained nickel cobalt composite hydroxide was washed, dehydrated, then, dried at 105° C. for 20 hours, and sieved, and particle size distribution measurement, specific surface area measurement, chemical composition analysis, and powder X-ray diffraction measurement were carried out. The results are shown in Table 3.

Comparative Example 2

Water was poured into a 2000 L cylindrical reaction vessel including a stirrer including a 350φ propeller-type stirring blade and an overflow pipe.

Next, a 32 mass % sodium hydroxide solution was added thereto until the pH reached 12.3 (when measured at a liquid temperature of the aqueous solution of 40° C.), and the temperature was held at 45° C. with a heater.

Next, nitrogen gas was continuously blown into the reaction vessel at a flow rate of 5 L/min to make the atmosphere in the reaction vessel into an inert atmosphere.

A nickel sulfate aqueous solution and a cobalt sulfate aqueous solution were mixed together such that the atomic ratio between nickel atoms and cobalt atoms reached 92.5:7.5 to prepare a liquid raw material mixture, and a solution mixture was continuously supplied to the reaction vessel at a constant rate.

A 2.8 mol/L ammonium sulfate solution was used as a complexing agent and continuously supplied to the reaction vessel at a constant rate such that the ammonia concentration in the reaction vessel reached 0.41 mol/L.

The flow rate of a 10.8 mass % aluminum sulfate aqueous solution was adjusted such that the atomic ratio among nickel atoms, cobalt atoms, and aluminum atoms reached 91.1:7.4:1.5.

Furthermore, 32 mass % of sodium hydroxide was intermittently added thereto in order to maintain the pH of the solution in the reaction vessel at 12.3 (when measured at a liquid temperature of the aqueous solution of 40° C.).

A nickel cobalt aluminum composite hydroxide-containing slurry obtained by the above-described reaction was caused to overflow from the overflow pipe, and the slurry that had been caused to overflow was collected as the target particles.

The obtained nickel cobalt composite hydroxide was washed, dehydrated, then, dried at 105° C. for 20 hours, and sieved, and particle size distribution measurement, specific surface area measurement, chemical composition analysis, and powder X-ray diffraction measurement were carried out. The results are shown in Table 3.

Comparative Example 3

Water was poured into a 500 L cylindrical reaction vessel including a stirrer including a 220φ propeller-type stirring blade and an overflow pipe. Next, a 32 mass % sodium hydroxide solution was added thereto until the pH reached 11.6 (when measured at a liquid temperature of the aqueous solution of 40° C.), and the temperature was held at 50° C. with a heater. Next, nitrogen gas was continuously blown into the reaction vessel at a flow rate of 5 L/min to make the atmosphere in the reaction vessel into an inert atmosphere.

A nickel sulfate aqueous solution and a cobalt sulfate aqueous solution were mixed together such that the atomic ratio between nickel atoms and cobalt atoms reached 93:7 to prepare a liquid raw material mixture, and a solution mixture was continuously supplied to the reaction vessel at a constant rate.

A 2.8 mol/L ammonium sulfate solution was used as a complexing agent and continuously supplied to the reaction vessel at a constant rate such that the ammonia concentration in the reaction vessel reached 0.41 mol/L.

Furthermore, 32 mass % of sodium hydroxide was intermittently added thereto in order to maintain the pH of the solution in the reaction vessel at 11.6 (when measured at a liquid temperature of the aqueous solution of 40° C.).

A nickel cobalt composite hydroxide-containing slurry obtained by the above-described reaction was stored in a slurry storage tank from the overflow pipe.

The nickel cobalt composite hydroxide-containing slurry stored in the slurry storage tank was introduced into a wet-type classifier liquid cyclone (manufactured by Murata Kogyo Co., Ltd., T-10B-1 type) at a liquid cyclone inlet pressure of 0.08 MPa, and the nickel cobalt composite hydroxide was classified into a large-particle diameter portion and a small-particle diameter portion.

The large-particle diameter portion was collected as the target particles of the nickel cobalt composite hydroxide.

The small-particle diameter portion was continuously refluxed to the reaction vessel as the particles of the nickel cobalt composite hydroxide that had failed to reach the target particle diameter. Furthermore, the nickel cobalt composite hydroxide-containing slurry that was present in the slurry storage tank was continuously refluxed to the reaction vessel while being appropriately dehydrated.

The obtained nickel cobalt composite hydroxide was dehydrated, then, dried at 105° C. for 20 hours, and sieved, and particle size distribution measurement, specific surface area measurement, chemical composition analysis, and powder X-ray diffraction measurement were carried out. The results are shown in Table 3.

Table 2 below shows the conditions for producing the precursors of Examples 1 to 4 and Comparative Examples 1 to 3.

TABLE 2

|  | Classification step Yes/No | Classification device | Liquid cyclone inlet pressure MPa | Ni/Co/Al mol % |
|---|---|---|---|---|
| Example 1 | Yes | Slurry screener | — | 89/11/— |
| Example 2 | Yes | Slurry screener | — | 92.5/7.5/— |
| Example 3 | Yes | Slurry screener | — | 91.1/7.4/1.5 |
| Example 4 | Yes | Liquid cyclone | 0.04 | 93/7/— |
| Comparative Example 1 | No | — | — | 91.1/7.4/1.5 |
| Comparative Example 2 | No | — | — | 91.1/7.4/1.5 |
| Comparative Example 3 | Yes | Liquid cyclone | 0.08 | 93/7/— |

Table 3 below shows Dmin, D10, D50, D90, Dmax, Dmin/Dmax, (D50−D10)/D50, (D90−D50)/D50, the BET values, α, β, α/β, and the values of silicon, which was an impurity, of the precursors of Examples 1 to 4 and Comparative Examples 1 to 3.

TABLE 3

|  | Dmin μm | D10 μm | D50 μm | D90 μm | Dmax μm | Dmin/ Dmax — | (D50 − D10)/ D50 — | (D90 − D50)/ D50 — | BET m²/g | α ° | β ° | α/β — | Silicon ppm |
|---|---|---|---|---|---|---|---|---|---|---|---|---|---|
| Example 1 | 9.3 | 12.6 | 15.9 | 20.9 | 36.8 | 0.25 | 0.21 | 0.32 | 12 | 1.77 | 1.23 | 1.44 | 106 |
| Example 2 | 9.3 | 12.8 | 16.2 | 21.5 | 36.8 | 0.25 | 0.21 | 0.33 | 20 | 1.16 | 0.86 | 1.35 | 113 |
| Example 3 | 7.9 | 11.6 | 14.7 | 19.4 | 36.7 | 0.22 | 0.21 | 0.32 | 16 | 0.83 | 0.83 | 1.00 | 111 |
| Example 4 | 9.4 | 13.2 | 16.6 | 21.7 | 36.8 | 0.26 | 0.20 | 0.31 | 28 | 0.88 | 0.89 | 0.99 | 96 |
| Comparative Example 1 | 4.7 | 9.9 | 17.2 | 28.2 | 73.5 | 0.06 | 0.42 | 0.64 | 30 | 1.57 | 1.07 | 1.46 | 135 |
| Comparative Example 2 | 5.5 | 10.7 | 17.7 | 27.7 | 61.8 | 0.09 | 0.40 | 0.57 | 35 | 2.16 | 1.38 | 1.57 | 134 |
| Comparative Example 3 | 6.6 | 11.1 | 14.6 | 19.9 | 36.8 | 0.18 | 0.24 | 0.36 | 45 | 1.69 | 1.08 | 1.56 | 132 |

As shown in the above-described results, in the precursors of Examples 1 to 4 to which the present invention was applied, the content of silicon, which was an impurity, became as low as less than 130 ppm. In contrast, the precursors of Comparative Examples 1 to 3 to which the present invention was not applied obtained the results that the content of silicon, which was an impurity, was as high as 130 ppm or more.

In addition, in the precursors of Examples 1 to 3 in which the hydroxide-containing slurry was classified using the screen in the classification step, the contents of silicon were lower than in the precursors of Comparative Examples 1 and 2 having no such classification step.

In addition, when the precursor of Example 4 and the precursor of Comparative Example 3, in which the liquid cyclone-type classification device was used in the classification step, are compared with each other, the content of silicon was low in the precursor of Example 4 in which the inlet pressure was 0.07 MPa or less. In contrast, in the precursor of Comparative Example 3 in which the inlet pressure exceeded 0.07 MPa, it was not possible to reduce the content of silicon.

REFERENCE SIGNS LIST

1: Separator
2: Positive electrode
3: Negative electrode
4: Electrode group
5: Battery can
6: Electrolytic solution
7: Top insulator
8: Sealing body
10: Lithium secondary battery
21: Positive electrode lead
31: Negative electrode lead

What is claimed is:

1. A precursor for lithium secondary battery positive electrode active materials, comprising:
nickel,
wherein the following formula (1) is satisfied, $$0.20 \leq D\mathrm{min}/D\mathrm{max} \tag{1}$$

where, in the formula (1), Dmin is a minimum particle diameter (μm) in a cumulative particle size distribution curve obtained by measuring the precursor with a laser diffraction-type particle size distribution measuring instrument, and Dmax is a maximum particle diameter (μm) in the cumulative particle size distribution curve obtained by the measurement with the laser diffraction-type particle size distribution measuring instrument, and
wherein the following formula (5) is satisfied, $$0.65 \leq \alpha/\beta \leq 1.45 \tag{5}$$

where, in the formula (5), α is a half width of a diffraction peak at 2θ=52.4±1° that is obtained by X-ray diffraction using a CuKα ray, and β is a half width of a diffraction peak at 2θ=73.9±1° that is obtained by X-ray diffraction using a CuKα ray.

2. The precursor according to claim 1,
wherein the precursor is represented by the following composition formula (A),

$$\mathrm{Ni}_{1-x-y}\mathrm{Co}_x\mathrm{M}_y\mathrm{O}_z(\mathrm{OH})_{2-\alpha} \tag{A}$$

where, in the composition formula (A), 0≤x≤0.45, 0≤y≤0.45, 0≤x+y≤0.9, 0≤z≤3, −0.5≤α≤2, and M is one or more metal elements selected from Zr, Al, Ti, Mn, Ga, In, and W.

3. The precursor according to claim 1,
wherein the following formula (4) is satisfied, $$10\,\mathrm{\mu m} \leq D50 \leq 30\,\mathrm{\mu m} \tag{4}$$

where, in the formula (4), D50 is a value (μm) of a particle diameter at a point at which a cumulative volume reaches 50% from a small particle side in the cumulative particle size distribution curve, with a total cumulative volume being set to 100%, obtained by measuring the precursor with the laser diffraction-type particle size distribution measuring instrument.

4. The precursor according to claim 1,
wherein the following formulae (2) and (3) are satisfied, $$(D50-D10)/D50 \leq 0.35 \tag{2}$$

and $$(D90-D50)/D50 \leq 0.50 \tag{3}$$

where, in the formulae (2) and (3), D10 is a value (μm) of a particle diameter at a point at which a cumulative volume reaches 10% from a small particle side in the cumulative particle size distribution curve, with a total cumulative volume being set to 100%, obtained by measuring the precursor with the laser diffraction-type particle size distribution measuring instrument, D50 is a value (μm) of a particle diameter at a point at which the cumulative volume reaches 50%, and D90 is a value (μm) of a particle diameter at a point at which a cumulative volume reaches 90%.

5. The precursor according to claim 1,
wherein a BET specific surface area is 2 m²/g or more and 80 m²/g or less.

6. A method for producing the precursor of claim 1, the method comprising:
a slurry preparation step of supplying a metal-containing aqueous solution containing at least nickel and an alkaline aqueous solution to a reaction vessel to obtain a hydroxide-containing slurry; and
a classification step of classifying the hydroxide-containing slurry using a screen.

7. The method according to claim 6,
wherein the precursor is represented by the following composition formula (A),

$$Ni_{1-x-y}Co_xM_yO_z(OH)_{2-\alpha} \quad (A)$$

where, in the composition formula (A), $0 \le x \le 0.45$, $0 \le y \le 0.45$, $0 \le x+y \le 0.9$, $0 \le z \le 3$, $-0.5 \le \alpha \le 2$, and M is one or more metal elements selected from Zr, Al, Ti, Mn, Ga, In, and W.

8. The method according to claim 6,
wherein the precursor satisfies the following formula (4), $$10\mu m \le D50 \le 30\mu m \quad (4)$$

where, in the formula (4), D50 is a value (μm) of a particle diameter at a point at which a cumulative volume reaches 50% from a small particle side in the cumulative particle size distribution curve, with a total cumulative volume being set to 100%, obtained by measuring the precursor with the laser diffraction-type particle size distribution measuring instrument.

9. The method according to claim 6, further comprising:
a reflux step of supplying the slurry that has passed through the screen to the reaction vessel.

10. The method according to claim 6,
wherein a material of the screen is a polymer material.

11. The method according to claim 6,
wherein, in the classification step, a classification device includes a rotatable screw inside a fixed screen, and
the hydroxide-containing slurry is classified by rotating the screw at a circumferential velocity of 1.0 m/second or faster and 10.0 m/second or slower.

12. A method for producing the precursor of claim 1, the method comprising:
a slurry preparation step of supplying a metal-containing aqueous solution containing at least nickel and an alkaline aqueous solution to a reaction vessel to obtain a hydroxide-containing slurry; and
a classification step of classifying the hydroxide-containing slurry with a liquid cyclone-type classification device,
wherein the classification step is carried out under a condition that a classification device inlet pressure is 0.01 MPa or more and 0.07 MPa or less.

13. The method according to claim 12,
wherein the precursor is represented by the following composition formula (A),

$$Ni_{1-x-y}Co_xM_yO_z(OH)_{2-\alpha} \quad (A)$$

where, in the composition formula (A), $0 \le x \le 0.45$, $0 \le y \le 0.45$, $0 \le x+y \le 0.9$, $0 \le z \le 3$, $-0.5 \le \alpha \le 2$, and M is one or more metal elements selected from Zr, Al, Ti, Mn, Ga, In, and W.

14. The method according to claim 12,
wherein the precursor satisfies the following formula (4), $$10\mu m \le D50 \le 30\mu m \quad (4)$$

where, in the formula (4), D50 is a value (μm) of a particle diameter at a point at which a cumulative volume reaches 50% from a small particle side in the cumulative particle size distribution curve, with a total cumulative volume being set to 100%, obtained by measuring the precursor with the laser diffraction-type particle size distribution measuring instrument.

15. The method according to claim 6, further comprising:
a heating step of heating a precursor in an oxygen-containing atmosphere within a temperature range of 300° C. or higher and 900° C. or lower.

16. A method for producing a lithium composite metal compound, the method comprising:
a mixing step of mixing the precursor obtained by the method according to claim 6 and a lithium compound; and
a calcining step of calcining the obtained mixture in an oxygen-containing atmosphere at a temperature of 500° C. or higher and 1000° C. or lower.

17. The precursor according to claim 2,
wherein the following formula (4) is satisfied, $$10\mu m \le D50 \le 30\mu m \quad (4)$$

where, in the formula (4), D50 is a value (μm) of a particle diameter at a point at which a cumulative volume reaches 50% from a small particle side in the cumulative particle size distribution curve, with a total cumulative volume being set to 100%, obtained by measuring the precursor with the laser diffraction-type particle size distribution measuring instrument.

18. The precursor according to claim 2,
wherein the following formulae (2) and (3) are satisfied, $$(D50-D10)/D50 \le 0.35 \quad (2) \text{ and}$$

$$(D90-D50)/D50 \le 0.50 \quad (3)$$

where, in the formulae (2) and (3), D10 is a value (μm) of a particle diameter at a point at which a cumulative volume reaches 10% from a small particle side in the cumulative particle size distribution curve, with a total cumulative volume being set to 100%, obtained by measuring the precursor with the laser diffraction-type particle size distribution measuring instrument, D50 is a value (μm) of a particle diameter at a point at which the cumulative volume reaches 50%, and D90 is a value (μm) of a particle diameter at a point at which a cumulative volume reaches 90%.

19. The precursor according to claim 2,
wherein a BET specific surface area is 2 m²/g or more and 80 m²/g or less.

20. The method according to claim 7,
wherein the precursor satisfies the following formula (4), $$10\mu m \le D50 \le 30\mu m \quad (4)$$

where, in the formula (4), D50 is a value (μm) of a particle diameter at a point at which a cumulative volume reaches 50% from a small particle side in the cumulative particle size distribution curve, with a total cumulative volume being set to 100%, obtained by measuring the precursor with the laser diffraction-type particle size distribution measuring instrument.

21. The method according to claim 7, further comprising:
a reflux step of supplying the slurry that has passed through the screen to the reaction vessel.

22. The method according to claim 7,
wherein a material of the screen is a polymer material.

23. The method according to claim 7,
wherein, in the classification step, a classification device includes a rotatable screw inside a fixed screen, and
wherein the hydroxide-containing slurry is classified by rotating the screw at a circumferential velocity of 1.0 m/second or faster and 10.0 m/second or slower.

24. The method according to claim 13,
wherein the precursor satisfies the following formula (4), $$10\mu m \leq D50 \leq 30\mu m \qquad (4)$$

where, in the formula (4), D50 is a value (μm) of a particle diameter at a point at which a cumulative volume reaches 50% from a small particle side in the cumulative particle size distribution curve, with a total cumulative volume being set to 100%, obtained by measuring the precursor with the laser diffraction-type particle size distribution measuring instrument.

25. The method according to claim 7, further comprising:
a heating step of heating a precursor in an oxygen-containing atmosphere within a temperature range of 300° C. or higher and 900° C. or lower.

26. A method for producing a lithium composite metal compound, the method comprising:
a mixing step of mixing the precursor obtained by the method according to claim 7 and a lithium compound; and
a calcining step of calcining the obtained mixture in an oxygen-containing atmosphere at a temperature of 500° C. or higher and 1000° C. or lower.

* * * * *